United States Patent
Patel et al.

(10) Patent No.: US 12,502,383 B2
(45) Date of Patent: Dec. 23, 2025

(54) PHARMACEUTICAL COMPOSITION OF CYCLOOXYGENASE-2 INHIBITORS

(71) Applicant: THEMIS MEDICARE LIMITED, Maharashtra (IN)

(72) Inventors: Dinesh Shantilal Patel, Maharashtra (IN); Sachin Dinesh Patel, Maharashtra (IN); Shashikant Prabhudas Kurani, Maharashtra (IN); Milind Vinayak Sathe, Maharashtra (IN)

(73) Assignee: THEMIS MEDICARE LIMITED, Maharashtra (IN)

( * ) Notice: Subject to any disclaimer, the term of this patent is extended or adjusted under 35 U.S.C. 154(b) by 811 days.

(21) Appl. No.: 17/785,784

(22) PCT Filed: Dec. 11, 2020

(86) PCT No.: PCT/IB2020/061812
§ 371 (c)(1),
(2) Date: Jun. 15, 2022

(87) PCT Pub. No.: WO2021/124044
PCT Pub. Date: Jun. 24, 2021

(65) Prior Publication Data
US 2023/0073803 A1  Mar. 9, 2023

(30) Foreign Application Priority Data
Dec. 16, 2019  (IN) .............................. 201921052016

(51) Int. Cl.
*A61K 31/444* (2006.01)
*A61K 9/08* (2006.01)
(Continued)

(52) U.S. Cl.
CPC .............. *A61K 31/444* (2013.01); *A61K 9/08* (2013.01); *A61K 31/42* (2013.01); *A61K 31/635* (2013.01);
(Continued)

(58) Field of Classification Search
CPC .... A61K 47/40; A61K 31/415; A61K 31/635; A61K 47/10; A61K 47/26; A61K 9/0019; A61K 9/0053; A61K 31/47; A61K 31/5415; A61K 31/675; A61K 47/02; A61K 31/196; A61K 31/42; A61K 31/444; A61K 31/542; A61K 31/663; A61K 47/20; A61K 47/32; A61K 47/42; A61K 47/46; A61K 47/6951; A61K 9/0024; A61K 9/06; A61K 9/08; A61K 9/20; A61K 31/52; A61K 31/7076; A61K 31/724; A61K 45/06; A61K 9/2018; A61K 2039/505; A61K 2300/00; A61K 31/4439; A61K 31/4745; A61K 31/727; A61K 45/00; A61K 47/38; A61K 47/50; A61K 9/00; A61K 9/0034; A61K 9/0043; A61K 9/0056; A61K 9/006; A61K 9/0095; A61K 9/19; A61K 9/2009; A61K 9/205; A61K 9/2054; A61K 47/14; A61K 47/24; A61K 47/44; A61K 9/107; A61K 47/00; A61K 9/10; A61K 31/167; A61K 31/565; A61K 31/57; A61K 31/573; A61K 9/0014; A61K 9/0048; A61K 9/1075; A61K 9/4858; A61P 29/00; A61P 25/04; A61P 19/02; A61P 35/00; A61P 43/00; A61P 15/00; A61P 19/00; A61P 25/00; A61P 25/06; A61P 1/04; A61P 11/00; A61P 11/06; A61P 13/12; A61P 17/02; A61P 17/06;
(Continued)

(56) References Cited

U.S. PATENT DOCUMENTS 6,383,471 B1  5/2002  Chen et al.
6,589,557 B2  7/2003  Straub et al.
(Continued)

FOREIGN PATENT DOCUMENTS

CN  103263385 A  8/2013
WO  200032189  6/2000
(Continued)

OTHER PUBLICATIONS

Chaudhari, P. et al. "Solubility enhancement of hydrophobic drugs using synergistically interacting cyclodextrins and cosolvent"; Current Science, vol. 92, Issue No. 11; pp. 1586-1591 (2007). (Year: 2007).*

(Continued)

*Primary Examiner* — Audrea B Coniglio
(74) *Attorney, Agent, or Firm* — CANTOR COLBURN LLP

(57) ABSTRACT

Present invention relates to aqueous compositions comprising cyclooxygenase-2 (COX-2) inhibitors, preferably Etoricoxib or Celecoxib or Valdecoxib or Paracoxib or salts thereof at least two solubilizers at 4.2% w/v to 19% w/v, preferably between 4.2% w/v to 18% w/v having viscosity in range of 1.0 cps to 3 cps, wherein the Etoricoxib and Celecoxib or salts thereof are present in amount ranging from 0.14 mg to 4 mg. The composition is suitable for the parenteral route of administration primarily for ready to dilute and ready to infuse which alternatively can be administered as intramuscular, intraarterial, intraocular, intraventricular, intravenous routes; also for subcutaneous, cutaneous delivery. The invention further provides a method for preparing the said composition.

27 Claims, No Drawings

(51) Int. Cl.

| | |
|---|---|
| A61K 31/42 | (2006.01) |
| A61K 31/635 | (2006.01) |
| A61K 47/02 | (2006.01) |
| A61K 47/10 | (2017.01) |
| A61K 47/20 | (2006.01) |
| A61K 47/26 | (2006.01) |
| A61K 47/40 | (2006.01) |

(52) U.S. Cl.
CPC .............. *A61K 47/02* (2013.01); *A61K 47/10* (2013.01); *A61K 47/20* (2013.01); *A61K 47/26* (2013.01); *A61K 47/40* (2013.01)

(58) Field of Classification Search
CPC .......... A61P 19/10; A61P 21/00; A61P 25/16; A61P 25/24; A61P 25/28; A61P 31/04; A61P 37/08; A61P 9/10
See application file for complete search history.

(56) References Cited

U.S. PATENT DOCUMENTS

| | | | |
|---|---|---|---|
| 6,589,973 | B1 | 7/2003 | Patel et al. |
| 7,695,736 | B2 | 4/2010 | Kararli et al. |
| 2005/0004098 | A1 | 1/2005 | Britten et al. |
| 2005/0004196 | A1 | 1/2005 | Kowala |
| 2008/0051373 | A1 | 2/2008 | Lichtenberger et al. |
| 2014/0296191 | A1 | 10/2014 | Patel et al. |
| 2016/0354390 | A1 | 12/2016 | Okumu et al. |
| 2019/0211103 | A1* | 7/2019 | Chen .................. C07K 16/2818 |

FOREIGN PATENT DOCUMENTS

| | | | |
|---|---|---|---|
| WO | 200069434 | | 11/2000 |
| WO | 200145705 | A1 | 6/2001 |
| WO | 200145706 | A1 | 6/2001 |
| WO | 2004094373 | A3 | 11/2004 |
| WO | 2005011600 | A3 | 2/2005 |
| WO | 2005041864 | A2 | 5/2005 |
| WO | 2008113177 | A1 | 9/2008 |
| WO | 2010071866 | A3 | 6/2010 |
| WO | 2016036588 | A1 | 3/2016 |

OTHER PUBLICATIONS

International Search Report; International Application No. PCT/IB2020/061812; International Filing Date—Dec. 11, 2020; Date of Mailing—Feb. 26, 2021; 3 pages.

Written Opinion of the International Searching Authority; International Application No. PCT/IB2020/061812; International Filing Date—Dec. 11, 2020; Date of Mailing—Feb. 26, 2021; 5 pages.

"Celecoxib" [Product Information]; Item No. 10008672; Cayman Chemical, Ann Arbor, MI; 1 page (2022).

Chowdary et al., "Effects of Cyclodextrins, Tween-80 and PVP on the Solubility and Dissolution Rate of Etoricoxib," Journal of Pharmaceutical Sciences and Research, (2011), vol. 3, (No. 7), 1344-1348.

Chowdary et al., "Formulation Development Studies on Enhancement of Solubility and Dissolution Rate of Etoricoxib by Cyclodextrin Complexation," Asian Journal of Chemistry, (2011), vol. 23, (No. 4), 1445-1448.

Chowdhury et al., "Preparation, Physicochemical Characterization and Dissolution Studies of Etoricoxib-B-Cyclodextrin Complexes," Asian Journal of Pharmaceutical Sciences, (2012), vol. 7, (No. 4), 280-289.

Gong et al., "Celecoxib Pathways: Pharmacokinetics and Pharmacodynamics," Pharmacogenet Genomics, (2012), vol. 22, (No. 4), 310-318.

Kumar et al., "Dissolution Enhancement of Poorly Soluble Drugs By Using Complexation Techniques—A Review," Journal of Pharmaceutical Sciences and Research, (2013), vol. 5, (No. 5), 120-124.

Nasir et al., "Cyclodextrins: An Excipient Tool In Drug Delivery," International Research Journal of Pharmacy, (2012), vol. 3, (No. 4), 44-50.

Nayak et al., "Solubility Enhancement of Etoricoxib by Cosolvency Approach" International Scholarly Research Network Physical Chemistry, (2012), Article ID 820653, 1-6.

Patel et al., "Preparation and Characterization of Etoricoxib-B-Cyclodextrin Complexes Prepared by the Kneading Method," Acta. Pharm., (2007), vol. 57, 351-359.

Reddy et al., "Preparation And Evaluation of Cyclodextrin Complexation of Etoricoxib," International Journal of Pharmaceutical Sciences and Research, (2012), vol. 3, (No. 12), 4938-4944.

Sapkal et al., "Formulation and Characterization of Etoricoxib Solid Dispersion Using Natural Polymers," (http://cms.galenos.com.tr/Uploads/Article_21080/TJPS-0-0-En.pdf, last visited on Aug. 14, 2019); 30 pages.

Singh et al., "Development And Pharmacological Evaluation of Cyclodextrin Complexes of Etoricoxib," Acta. Poloniae Pharmaceutica Drug Research, (2011), vol. 68, (No. 2), 279-284.

Patidar et al., "Formulation & Evaluation of Solid Dispersion of Etoricoxib For Solubility Enhancement by Using B-Cyclodextrin," World Journal of Pharmacy and Pharmaceutical Sciences, vol. 8, Issue No. 6; pp. 1450-1459 (2019).

Chaudhari, P. et al.; "Solubility enhancement of hydrophobic drugs using synergistically interacting cyclodextrins and cosolvent"; Current Science, vol. 92, Issue No. 11; pp. 1586-1591 (2007).

* cited by examiner

PHARMACEUTICAL COMPOSITION OF CYCLOOXYGENASE-2 INHIBITORS

CROSS REFERENCE TO RELATED APPLICATIONS

This application is a National Stage application of PCT/IB2020/061812, filed Dec. 11, 2020. This application claims priority to India application No. 201921052016, filed Dec. 16, 2019, the entire contents of which are incorporated herein by reference.

FIELD OF INVENTION

Present invention relates to compositions of cyclooxygenase-2 (COX-2) inhibitors, more specifically an injectable composition comprising Etoricoxib or Celecoxib or combination thereof optionally with other pharmaceutical actives.

BACKGROUND OF INVENTION

Prior art have a review on COX 2 inhibitors and their structure activity relationship. The chemical structures of COX-2 inhibitors are heterogenic. This new class of enzyme inhibitors lacks a carboxylic group, thus effects COX-2 affinity by not forming a salt bridge in the hydrophobic channel of the enzyme. Selective COX-2 inhibitors have two major structural classes: Tricyclics (also known as ortho-diaryl heterocycles or carbocycles) and Non-tricyclics.

All of the compounds of tricyclic class possess 1,2-diaryl substitution on a central hetero or carbocyclic ring system with a characteristic methanesulfonyl, sulfonamido, azido, methanesulfonamide or pharmacophore-based tetrazole group on one of the aryl rings that plays a crucial role on COX-2 selectivity. Coxibs such as Celecoxib, Rofecoxib, Valdecoxib and etc, belong to this common structural class.

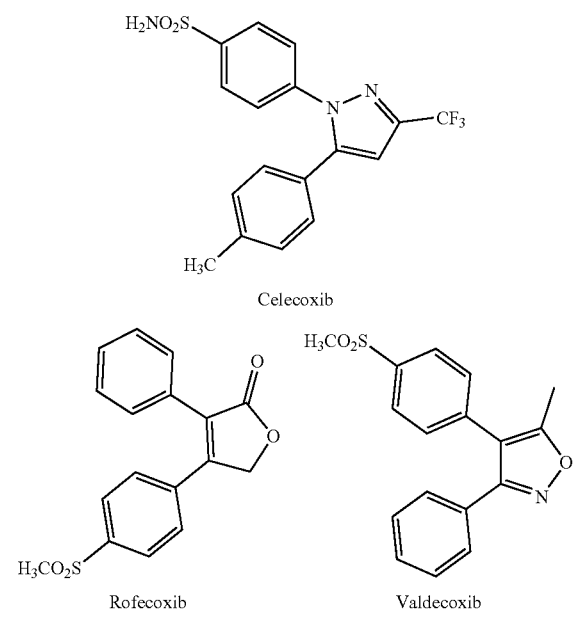

Celecoxib

Rofecoxib

Valdecoxib

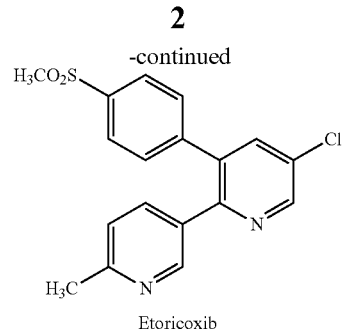

Etoricoxib

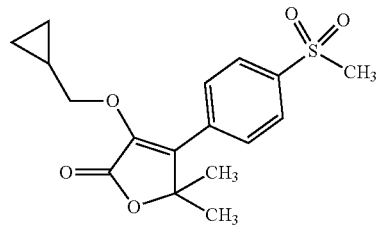

Firocoxib

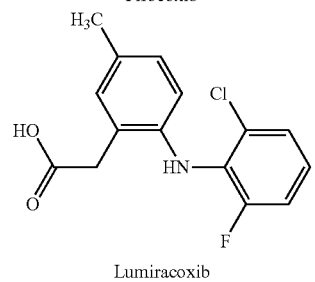

Lumiracoxib

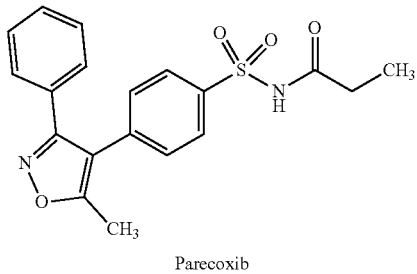

Parecoxib

Inhibition of prostaglandin synthesis is the central mechanism by which NSAIDs reduce inflammation and pain in arthritis and other inflammatory conditions. For many years, it was believed that there could be no therapeutic gain without the pain of gastrointestinal toxicity. Discovery of 2 two cyclo-oxygenase (COX) enzymes COX-1 and COX-2 changed this perception. This recognition stimulated the development of a range of selective COX-2. Drugs Celecoxib and Rofecoxib were discovered by this process.

There is a high degree of homology between COX-1 and COX-2: 61% of amino acids are identical and 84% are similar. The single methyl group difference is sufficient to create extra space in the active site and this has become recognized as the COX-2 pocket. It is at this site that rofecoxib, celecoxib and other related tri-cyclic enzymes appear to act. These drugs are too bulky to access COX-1 easily and hence selectivity is achieved. Another difference is substitution of leucine (in COX-2) for phenylalanine (in COX-1), which leads to greater flexibility of the roof of the active site in COX-2.

Another difference between COX-1 and COX-2 is that binding of NSAIDs to COX-1 is by reversible hydrogen-bonding and inhibition by simple stearic hindrance.

Etoricoxib is a member of the class of bipyridines that is 2, 3'-bipyridine which is substituted at the 3, 5, and 6' positions by 4-(methylsulfonyl)phenyl, chlorine, and methyl groups, respectively. Etoricoxib possesses unique chemical structure that is methylsulfonyl group and displays highly selective cyclooxygenase-2 (COX-2) inhibitor activity, which belongs to a family of pain killers called non-steroidal anti-inflammatory drugs (NSAIDs). It is also used to treat patients suffering from joint pain and swelling caused by osteoarthritis, rheumatoid arthritis, ankylosing spondylitis and gout (PubChem).

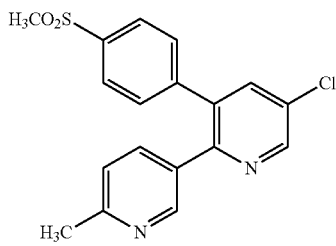

Etoricoxib

Etoricoxib is a kind of highly selective cyclooxygenase-2 (COX-2) inhibitors developed by the Merck company with the chemical name being 5-chloro-6'-methyl-3-4-(methanesulfonamide) phenyl]-2, 3'-bipyridine. Etoricoxib was first approved for entering into market in 2002 in the UK, followed by the marketing countries and regions including the European Union, Asia, Australia and Latin America. It is approved for marketing in at least 97 countries for being widely used in treatment of osteoarthritis (OA), rheumatoid arthritis, ankylosing spondylitis, chronic low back pain, acute gouty arthritis, primary dysmenorrhea and postoperative pain, and other diseases. Etoricoxib is also registered in Taiwan and Hong Kong.

Etoricoxib has a low gastrointestinal reaction. During the treatment, the gastrointestinal symptoms (nausea, vomiting, abdominal pain or discomfort, diarrhea), chest and ankle edema and other adverse events for Etoricoxib is similar to other selective COX-2 inhibitors. It is contraindicated in patients with ischemic heart disease and stroke.

The usual oral dose of Etoricoxib is 30 mg to 120 mg daily. In the U.K., the maximum dose regardless of route or indications is 120 mg daily. The recommended dose for Osteoarthritis is 30 mg once a day, increase to a maximum of 60 mg once a day if needed rheumatoid arthritis. The recommended dose for rheumatoid arthritis and ankylosing spondylitis is 60 mg once a day, increased to a maximum of 90 mg once a day if needed. The recommended dose for gout is 120 mg once a day which should only be used for the acute painful period, limited to a maximum of 8 days treatment. The recommended dose for postoperative dental surgery pain is 90 mg once daily, limited to a maximum of 3 days treatment (Torrent Pharma, UK Ltd).

Etoricoxib is freely soluble in methanol, tetrahydrofuran, dimethyl sulfoxide, methyl ethyl ketone, dimethyl formamide, and chloroform. Etoricoxib is soluble in isopropyl acetate, ethanol and toluene, sparingly soluble in 2-propanol, and practically insoluble in water. Bioavailability of Etoricoxib after oral and intravenous administration is 100% and protein binding is about 92%.

Celecoxib having chemical name 4-[5-(4-methylphenyl)-3-(trifluoromethyl) pyrazol-1-yl]benzenesulfonamide, is a nonsteroidal anti-inflammatory drug (NSAID) with a diaryl-substituted pyrazole structure. It selectively inhibits cyclooxygenase-2 activity (COX-2).

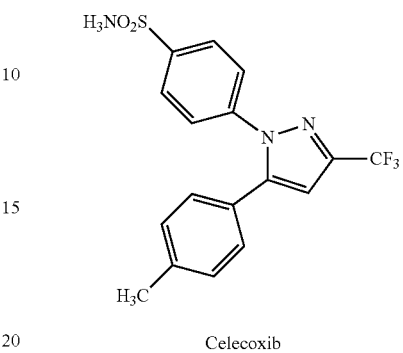

Celecoxib

Celecoxib is currently used COX-2 inhibitor, developed by GD Searle & Pfizer Co. (U.S.). Celecoxib has significant analgesic and anti-inflammatory effects, causing the lowest incidence of upper gastrointestinal tract ulcers and other complications. It is used clinically to treat acute and chronic osteoarthritis and rheumatoid arthritis, with an anti-inflammatory analgesic role, relieving the signs and symptoms of osteoarthritis and rheumatoid arthritis (CAS No. 169590-42-5, Chemical Product Property, Chemical Book).

After oral administration, Celecoxib is rapidly absorbed and achieves peak serum concentration in approximately 3 h. It is extensively metabolized in the liver, with very little drug (<3%) being eliminated unchanged. The major routes of excretion for Celecoxib are feces and urine. Although the selectivity for COX-2 measured in vitro is lower for Celecoxib compared with other drugs in the coxib class (e.g. Rofecoxib, Valdecoxib, Lumiracoxib and Etoricoxib), it is very similar at therapeutic concentrations in vivo. (Gong L et al Celecoxib pathways: pharmacokinetics and pharmacodynamics, Pharmacogenet Genomics. 2012 April; 22 (4): 310-318).

Coxibs present problem in solubility. For example, Etoricoxib is a white to off-white powder. Etoricoxib is freely soluble in methanol, tetrahydrofuran, dimethyl sulfoxide, methyl ethyl ketone, dimethyl formamide, and chloroform. Etoricoxib is soluble in isopropyl acetate, ethanol and toluene, sparingly soluble in 2-propanol, and practically insoluble in water.

Celecoxib is practically insoluble in water, freely soluble to soluble in anhydrous ethanol, soluble in methylene chloride. Celecoxib is chemically unrelated to anti-inflammatory agents of steroidal or non-steroidal nature.

Celecoxib is soluble in organic solvents such as ethanol, DMSO, and dimethyl formamide (DMF), which should be purged with an inert gas. The solubility of celecoxib in ethanol and DMF is approximately 25 mg/ml and approximately 16.6 mg/ml in DMSO.

Prior art has references wherein Cox II inhibitors were compounded into compositions.

Patent CN103263385A the invention relates to long-acting nano depot injection containing Celecoxib serving as a main component and preserved in a prefilled syringe in a suspension form or preserved in a sealed container in a dry powder form and being used for treating rheumatoid. It necessitates the high pressure homogenizer, Freeze Dryers making the practical exploitation expensive and time consuming.

Patent US20050004098A1 disclosed a method of treatment and/or prevention of an inflammatory condition in a fluid-containing organ having a natural exterior orifice, the method comprising administering a dispersible pharmaceutical composition comprising an anti-inflammatory agent administering in combination therapy with a Second agent Selected from the group consisting of antibacterial agents or anesthetics wherein the Second agent is administered by a route other than the route of administration of the anti-inflammatory agent. This prior art discloses use of microcrystalline wax which is not included in IID by USFDA. Use of microcrystalline wax in parenteral formulations is not desirable.

Patent US20050004196 A1 discloses pharmaceutical compositions including ether and selective cox-2 inhibitor and methods for using such. The formulation comprises active COX II inhibitor filled in ampoule/vials and available as lyophilized form. Lyophilization process requires Freeze Dryers which is expensive, not easily available, time consuming and expensive.

Patent US20080051373 A1 describes a parenteral preparation of a phospholipid-associated anti-inflammatory prepared by a process comprising: dissolving a phospholipid and an anti-inflammatory pharmaceutical in a polar solvent at an elevated temperature to produce a heated solution; cooling the heated solution to room temperature to produce a cooled solution; drying the cooled solution to produce a dried composition; resuspending the dried composition in an aqueous medium to produce a resuspended composition; and sterilizing the resuspended composition by filtration, irradiation, heat, chemical exposure, gas treatment, or a combination thereof to produce the sterile preparation of a phospholipid-associated anti-inflammatory. It is a parenteral preparation of GI-safer phospholipid. The formulation process comprises use of some toxic solvents like Acetonitrile, dimethyl formamide. Toxnet has reported that the toxicity can occur after ingestion, inhalation, or dermal exposure. Acetonitrile is readily absorbed in the lungs, skin, and gastrointestinal tract. All three routes have been implicated in human toxicity. The liberation of cyanide accounts for the toxicity of acetonitrile. Toxnet also reported the hepatotoxicity of dimethyl formamide.

WO 2005011600 A3 relates to sterile composition including a phospholipid (PL) and an anti-inflammatory pharmaceutical (AIP) such as a nonsteroidal, anti-inflammatory drugs (NSAID), a cyclooxygenase 2 (COX-2) inhibitor or the like or mixtures or combinations thereof and methods for making and using same, where the preparations are capable of passing through a filter having a pore size sufficiently small to result in a filtrate that is considered sterile for medical applications. The prior art is silent about the pain caused due to injecting the compositions and their viscosities. One study has concluded that all phospholipid with surfactant increases the viscosity of formulation. Viscous liquids are painful to administer parenterally. Besides these ambiguities, aseptic methods are not encouraged for preparations of injectable compositions.

U.S. Pat. No. 6,589,557, assigned to Acusphere describes porous matrices of Celecoxib with an enhanced rate of dissolution. The porous matrix may be reconstituted with an aqueous medium and administered parenterally. The disclosures are silent on stability of porous matrices and solutions formed therefrom. The prior art discloses that spray drying, optionally followed by lyophilization, fluid bed drying, or vacuum drying, is used to remove the solvents and the pore forming agent. The process disclosed herein is long, time consuming and costlier. Invention makes use of Cetomacrogol which is not desirable for parenteral use. It is not included either in IID by USFDA as for parenteral use or not reported any other regulatory body for parenteral use.

U.S. Pat. No. 7,695,736 relates to parenterally deliverable formulations of water-soluble selective COX-2 inhibitory drugs and salts and prodrugs thereof. The invention describes dosage forms that are prepared as lyophilized powders for reconstitution. Lyophilization is a costly affair. Lyophilization cycle time is about 18 to about 24 hours which is very longer time to complete the formulation.

Patent U.S. Pat. No. 6,589,973 describes a clear stable pharmaceutical preparation of selective COX-2 inhibitors preferably in the parenteral form. It teaches that injectable formulations of COX-2 inhibitors can be obtained only when dissolved in a selective isosorbide type solvent such as Dimethyl isosorbide or DMI. It is silent on the aspects of dilution of the composition for administration. Inactive ingredient database is silent about use of DMI solvent for injectable purposes.

U.S. Pat. No. 6,383,471 teaches compositions and methods for improved delivery of hydrophobic agents. Invention makes use of acetic acid and glacial acetic acid. Data published on Toxnet has reported that the use of such solvent may induce toxicity. It causes hypotension and arrhythmia, extreme eye and nasal irritation, conjunctivitis, permanent corneal opacification. Use of solvents such as acetic acid or glacial acetic acid is undesirable in pharmaceutical preparations. The invention also makes the use of hydrogenated castor oil, polyoxyethylene sorbitan fatty acid esters, sorbitan fatty acid esters and polyoxyethylene alkyl ethers. Use of castor oil has unfavorable safety profile. Also some other excipients like fatty acid esters may have safety concern.

WO Publication 2008/113177 discloses various compounds and compositions comprising polyunsaturated fatty acid monoglycerides and derivatives thereof. Invention elaborated the process of synthesis but formulation is not explained.

WO 2016036588A1 discloses the Pharmaceutical suspensions containing Etoricoxib. As a suspension it contains viscosity modifying agent is selected from the group consisting of a polyethylene glycol and sodium carboxymethylcellulose which may form viscous formulation. Hence it may cause the pain while administering it to the patient.

US20140296191A1 discloses Etoricoxib 90 mg/ml compositions containing Diethylene Glycol Monoethyl Ether (Transcutol) or other alkyl derivatives. Product of prior art invention on further dilution for use as IV infusion may get precipitated. Unlike prior art invention, the composition of present invention remains clear and stable on further dilution therefore is suitable for intravenous administration as infusion.

The viscosity of prior art composition is cited as 3.7 cps and viscosity of composition of present invention is about 1.0 to 3.0 cps. Hence the present formulation is pain free or less painful as compared to the prior art formulation.

WO 2001/045705 A1, WO 2001/045706 A1, WO 2000/069434 A1 and WO 2000/032189 have disclosed preparation of oral formulations of Celecoxib. Although prior art formulations are for treatment of COX-2 mediated disorders, it is limited to oral route of administration and hence are beyond the scope of current invention.

US20160354390 discloses oil in water emulsion of Lecithin and Celecoxib wherein celecoxib to the lecithin is about 0.1:1 or less. It employees oily components which may cause allergy or increase viscosity and cause pain.

Etoricoxib is important COX-2 inhibitor. It is surprising to note that aqueous composition of Etoricoxib for parenteral administration is not available. In India, Etoricoxib is available for IM administration. There is no composition in the market for IV administration. Not all patients can take IM injection. There are inherent problems in preparing aqueous composition of Etoricoxib for IV administration. May be there are inherent problems of solubility.

Very low aqueous solubility of coxibs in general and more specifically of Etoricoxib or Celecoxib causes formulation problems and limits its therapeutic applications by delaying rate of absorption and onset of action. Improving the aqueous solubility without jeopardizing stability of composition is a challenge. Solution containing higher concentration of Coibs, more specifically Etoricoxib and Celecoxib would provide prompt action and such composition is not available at present.

IV compositions have an advantage that IV administration of a drug results in attainment of a therapeutically effective blood concentration of the drug in a shorter time as compared to IM or oral administration. IV composition of Celecoxib or Etoricoxib is need of the hour and is not present in Indian or overseas market.

Although there have been many publications on formation of complexes with Betacyclodextrins, there is void with respect to stabilizing Coxibs and more specifically Etoricoxib or Celecoxib in liquid compositions such that 1.2 mg to 4 mg are solubilized per ml.

In "*Solubility Enhancement of Etoricoxib by Cosolvency Approach*" ISRN Physical Chemistry, Volume 2012, Article ID 820653, 5 pages, http://dx.doi.org/10.5402/2012/820653 (last visited on 14 Aug. 2019), by Amit Kumar Nayak and Prachi Prava Panigrahi, describe use of PEG 400, PG, and glycerin as cosolvents, the article is silent on stability of solutions and their parenteral application. It does not provide slightest hint to produce a composition of Etoricoxib where 1.2 mg and or Celcoxib 4 mg are solubilized and stabilized. The fact that there is no aqueous parenteral composition available so far, is conclusive that the concept of cosolvents as described falls short of practical needs.

Attempts were made by Sandip Babarao Sapkal et al (http://cms.galenos.com.tr/Uploads/Article_21080/TJPS-0-0-En.pdf, last visited on 14 Aug. 2019) to prepare solid dispersions of Etoricoxib using natural polymers. But the literature is devoid of stability profiles and applications into parenteral compositions.

In *Cyclodextrins: Excipient tool in drug delivery, International Research Journal of Pharmacy*, ISSN 2230-8407, Review Article by Ms/Ali Nasir, Harikumar S. L., Kaur Amanpreet, Table 2 depicts Effect of CDs in Oral Drug delivery wherein Etoricoxib is indicated with the remark of enhanced solubility and efficacy. Article describes CDs in Oral drug delivery, Nasal delivery, Opthalmic, Transdermal, Lyposomal and nanoparticle deliveries. Article does not provide any hint for stable, aqueous, parenteral composition of Etoricoxib. The article is silent on stability of solutions or solid dosage forms prepared using CDs.

In "Dissolution enhancement of poorly soluble drugs by using complexation techniques—A review" by Saravanakumar K, Sushma M, Prasanna Raju Y, J. Pharm Sci and Res, Vol 5(5), 2013, 120-124, a reference is made on page 123 to dissolution enhancement of Celecoxib by complexation without any stability data and parenteral application.

K. P. R. Chowdary, S. Srinivasan in J. Pharm. Sci. & Res. Vol. 3(7), 2011, 1344-1348, Effects of Cyclodextrins, Tween-80 and PVP on the Solubility and Dissolution Rate of Etoricoxib describe Solid inclusion complexes of Etoricoxib-CD prepared in 1:2 ratio by kneading method, followed by triturating in a mortar with a small volume of solvent consisting of a blend of water:methanol (1:1). The thick slurry formed was kneaded for 45 min and then dried at 55° C. until dry. It concludes the enhancement of solubility. In some other works they report use of 1:1 Molar concentration of Etoricoxib and CD. However it is silent on stable IV aqueous compositions. It is difficult to stabilize COX-2 inhibitors such as Etoricoxib and Celecoxib and exactly this critical aspect is not attended. It does not give slightest hint as to how to prepare stable injectable compositions of coxibs and Celecoxib or Etoricoxib in particular.

Preparation and evaluation of cyclodextrin complexation of Etoricoxib, by Mettu Shrikanth Reddy and N. G. Raghavendra Rao in IJPSR, 2012, Vol 3 (12), 4938-4944 describe Etoricoxib—BCD and Etoricoxib—HPBCD complexes and improved dissolution. They use Methanol water solvent during process. The article is silent about stability of the complex and guidance to prepare stable aqueous IV composition of Etoricoxib.

Rajnandini Patidar, Dr. Shikha Agarwal in World Journal of Pharmacy and Pharmaceutical Sciences, Vol 8, issue 6, 1450-1459, describe solid dispersion of Etoricoxib for enhancing solubility by beta cyclodextrin. The article is silent about stability of complexes, process to formulate a stable aqueous IV composition of Etoricoxib.

Asian Journal of Pharmaceutical Sciences 2012, 7 (4), 280-289, Sanchita Sharmin Chowdhuri et al conclude possibility of enhancement of drug dissolution if ETC-BCD complex could be formed.

Similar conclusions are drawn in Asian Journal of Chemistry, Vol 23, No 4 (2011), 1445-1448, by K P R Chowdhary and M. Venkata Reddy while studying 1:1 M complexes of BCD and Etoricoxib. They have shown enhanced solubility and faster dissolution.

Acta Pharm 57, (2007), 351-359, 10.2478/v 10007-007-0028-2, Haresh M. Patel et al conclude that Etoricoxib drug in the system of 1:1 Molar complexes of Etoricoxib and BCD was more hydrophilic and more easily wettable as compared to pure drug in dissolution medium.

Acta Poloniae Pharmaceutica, Drug Research, Vol 68 No 2 pp 279-284, 2011, Development and pharmacological Evaluation of Cyclodextrin Complexes of Etoricoxib by Inderbir Singh et al, describe increased Etoricoxib solubility when complexed with beta cyclodextrin or hydroxyl propyl beta cyclo dextrin. Study concluded that complexed Etoricoxib has enhanced antinociceptive effect.

When tried with some commonly used solvents, compositions of Etoricoxib and Celecoxib were found to be unstable when subjected to Stability Study at 25° C./60% RH, 30° C./65% RH, and 40° C./75% RH. Loss of stability was visible in 3M at 25° C./60% RH, 30° C./65% RH. Therefore stabilizing coxibs in general and more particularly Etoricoxib or Celecoxib in aqueous environment is a challenge. In the light of available information, stabilizing Etoricoxib or Celecoxib is unpredictable.

Etojet is one injectable composition available in the market but it is non aqueous composition and is not for infusion. The composition is incompatible with water. On adding 5% w/v or v/v of water, the composition exhibits crystallization in about 5 to 10 days. Secondly it has limitation of providing only 90 mg/ml. It cannot solubilize more than 90 mg/ml as any such attempt leads to crystallization and an unstable composition. Etoricoxib has inherent solubility problems with water and is stumbling block in providing aqueous solution.

Although Transcutol might be used by few as solvent, it by itself alone or in presence of benzyl alcohol fails to provide an aqueous clear stable composition.

This typical behavior of coxibs, more specifically Etoricoxib, Celecoxib, Parecoxib and Valdecoxib poses problem in providing an aqueous composition or a composition suitable for infusion. This is an unfulfilled need.

It must be noted that although from 2007 onwards there are many academic publications describing complexation of poorly soluble drugs such as Etoricoxib, so far Etoricoxib is not available in the form of aqueous composition or infusion or IV form. This is sufficient to understand that there exists a serious problem in commercializing Etoricoxib cyclodextrin complex in the form of IV infusion. Formation of stable complex, gap between expected solubility and achievable solubility, stability of complex, compatibility of excipients with complex, stability of liquid injectable, stability of Etoricoxib in complex in liquid injectable are some of the areas where there can be a problem. The problem may be at one or more than one areas, thereby disabling preparation of stable aqueous IV composition of Etoricoxib.

There remains a long felt need to develop and provide a parenteral composition of COX-2 inhibitors, especially of Etoricoxib and Celecoxib that can be quite useful in acute conditions, such as post-operative pain, acute lower back pain, opioid-resistant pain, visceral pain, surgical pain, bone injury pain, pain during labor, pain resulting from burns, post-partum pain, genitourinary tract related pain including cystitis, and the nociceptive pain or nociception, and alike, such that it can be administered by IV route.

Pharmaceutical composition of selective COX 2 inhibitors such as Etoricoxib or Celecoxib or salts thereof, in parenteral form capable of instant therapeutic action is the unfulfilled need.

Parenteral composition comprising Etoricoxib 1.2 mg/ml or Celecoxib 4 mg/ml is an unfulfilled need.

Intravenous ready-to-infuse or ready-to-dilute formulation COX 2 inhibitors such as Etoricoxib or Celecoxib is an unfulfilled need.

Intravenous infusion formulation of COX 2 inhibitors such as Etoricoxib or Celecoxib for use in the longer term and for long action is an unfulfilled need.

A pharmaceutical preparation of selective COX 2 inhibitors such as Etoricoxib or Celecoxib or salts thereof for administration via other parenteral routes viz. intramuscular, intra-arterial, intraocular, intraventricular routes; also for subcutaneous, cutaneous and ocular delivery is an unfulfilled need.

A simple and economical pharmaceutical preparation of selective COX 2 inhibitors such as Etoricoxib or Celecoxib or salts thereof, in parenteral form for administration by IM, IV, subcutaneous, intraocular, intraventricular, cutaneous and ocular routes is an unfulfilled need.

A pharmaceutical preparation of selective COX 2 inhibitors such as Etoricoxib or Celecoxib or salts thereof, in parenteral form which would be clear, stable and easily administrable preferably ready-to-dilute or ready-to-infuse injection is an unfulfilled need.

A composition providing an accurate dose of selective COX 2 inhibitors such as Etoricoxib or Celecoxib or salts thereof, in parenteral form which would be clear, stable, limpid and easily administrable preferably ready-to-dilute or ready-to-infuse injection is an unfulfilled need.

A composition of COX 2 inhibitors such as Etoricoxib or Celecoxib or salts thereof with cyclodextrin, preferably betacyclodextrin or hydroxybetacyclodextrin or Sulphabuty betadex sodium which would be clear, stable, limpid and easily administrable preferably ready-to-dilute or ready-to-infuse injection that can be administered by parenteral routes viz. intramuscular, intra-arterial, intraocular, intraventricular routes; also for subcutaneous, cutaneous and ocular routes is an unfulfilled need.

OBJECTS OF THE INVENTION

The main object of the present invention is to provide pharmaceutical composition of selective COX 2 inhibitors such as Etoricoxib or Celecoxib or salts thereof, in parenteral form capable of instant therapeutic action.

Another object of the present invention is to provide intravenous ready-to-infuse or ready-to-dilute formulations of selective COX 2 inhibitors such as Etoricoxib or Celecoxib or salts thereof.

Yet another object of the present invention is to provide an intravenous infusion formulation of selective COX 2 inhibitors such as Etoricoxib or Celecoxib or salts thereof for use in the longer term and for long action.

Yet another object of the present invention is to provide ready-to-dilute or ready-to-infuse pharmaceutical preparation of selective COX 2 inhibitors such as Etoricoxib or Celecoxib or salts thereof to the hospitalized patients in painful conditions to manage the pain.

Yet another Object of the present invention is to provide ready-to-dilute or ready-to-infuse pharmaceutical preparation of selective COX 2 inhibitors such as Etoricoxib or Celecoxib or salts thereof in management of musculoskeletal and joint disorders like rheumatoid arthritis, osteoarthritis, ankylosing spondylitis, hemophilic arthropathy painful condition such as acute gout, dysmenorrhoea and some surgical procedures, post operative pain, acute postoperative pain, for treatment of inflammation after surgery.

Yet another object of the invention is to provide a pharmaceutical preparation of selective COX 2 inhibitors such as Etoricoxib or Celecoxib or salts thereof for administration via other parenteral routes viz. intramuscular, intra-arterial, intraocular, intraventricular routes; also for subcutaneous, cutaneous and ocular delivery.

Yet another Object of the present invention is to provide pharmaceutical preparation of selective COX 2 inhibitors such as Etoricoxib or Celecoxib or salts thereof, in parenteral form which would be simple and economical.

Yet another Object of the present invention is to provide pharmaceutical preparation of selective COX 2 inhibitors such as Etoricoxib or Celecoxib or salts thereof, in parenteral form which would be clear, stable and easily administrable preferably ready-to-dilute or ready-to-infuse injection.

Yet another Object of the present invention is to provide the accurate dose of pharmaceutical preparation of selective COX 2 inhibitors such as Etoricoxib or Celecoxib or salts thereof, in parenteral form which would be clear, stable, limpid and easily administrable preferably ready-to-dilute or ready-to-infuse injection.

Yet another object of the invention is to provide a composition of COX 2 inhibitors such as Etoricoxib or Celecoxib or salts thereof with cyclodextrin, preferably betacyclodextrin or hydroxypropyl betacyclodextrin which would be clear, stable, limpid and easily administrable preferably ready-to-dilute or ready-to-infuse injection that can be administered by parenteral routes viz. intramuscular, intraarterial, intraocular, intraventricular routes; also for subcutaneous, cutaneous and ocular routes.

Yet another object of the invention is to provide a clear, stable, limpid and easily administrable preferably ready-to-dilute or ready-to-infuse composition comprising Etoricoxib 1.2 mg/ml and or Celecoxib 4 mg/ml.

Yet another object of the invention is to provide a composition comprising 1.2 to 4 mg/ml of coxib more specifically Celecoxib or Etoricoxib or Parecoxib or Valdecoxib ledicoxib, having a viscosity of 1.0 cps to 3 cps, at least two solubilizers between 4.2% w/v to 18% w/v and at least one excipient selected from solvent/cosolvent, surfactant, preservative, antioxidants, buffer and tonicity modifier.

SUMMARY OF THE INVENTION

There is provided a pharmaceutical composition of selective COX 2 inhibitors such as Etoricoxib or Celecoxib or salts thereof, in parenteral form capable of instant therapeutic action.

There is provided a pharmaceutical composition in the form of intravenous ready-to-infuse or ready-to-dilute formulations of selective COX 2 inhibitors such as Etoricoxib or Celecoxib or salts thereof.

There is provided a pharmaceutical composition in the form of an intravenous infusion formulation of selective COX 2 inhibitors such as Etoricoxib or Celecoxib or salts thereof for use in the longer term and for long action.

There is provided a pharmaceutical composition in the form of ready-to-dilute or ready-to-infuse pharmaceutical preparation of selective COX 2 inhibitors such as Etoricoxib or Celecoxib or salts thereof to the hospitalized patients in painful conditions to manage the pain.

There is provided a pharmaceutical composition in the form of ready-to-dilute or ready-to-infuse pharmaceutical preparation of selective COX 2 inhibitors such as Etoricoxib or Celecoxib or salts thereof in management of musculoskeletal and joint disorders like rheumatoid arthritis, osteoarthritis, ankylosing spondylitis, hemophilic arthropathy painful condition such as acute gout, dysmenorrhoea and some surgical procedures, post operative pain, acute postoperative pain, for treatment of inflammation after surgery.

There is provided a pharmaceutical composition of selective COX 2 inhibitors such as Etoricoxib or Celecoxib or salts thereof for administration via other parenteral routes viz. intramuscular, intra-arterial, intraocular, intraventricular routes; also for subcutaneous, cutaneous and ocular delivery.

There is provided a pharmaceutical composition of selective COX 2 inhibitors such as Etoricoxib or Celecoxib or salts thereof, in parenteral form which would be simple and economical.

There is provided a pharmaceutical composition of selective COX 2 inhibitors such as Etoricoxib or Celecoxib or salts thereof, in parenteral form which would be clear, stable and easily administrable preferably ready-to-dilute or ready-to-infuse injection.

There is provided a pharmaceutical composition enabling the accurate dose of pharmaceutical preparation of selective COX 2 inhibitors such as Etoricoxib or Celecoxib or salts thereof, in parenteral form which would be clear, stable, limpid and easily administrable preferably ready-to-dilute or ready-to-infuse injection.

There is provided a pharmaceutical composition of COX 2 inhibitors such as Etoricoxib or Celecoxib or salts thereof with cyclodextrin, preferably betacyclodextrin or hydroxypropyl betacyclodextrin or SBECD which would give clear, stable, limpid and easily administrable preferably ready-to-dilute or ready-to-infuse injection that can be administered by parenteral routes viz. intramuscular, intra-arterial, intraocular, intraventricular routes; also for subcutaneous, cutaneous and ocular routes.

There is provided a Stable, clear composition comprising COX 2 inhibitors such as Etoricoxib or Celecoxib or salts thereof 1.2 mg to 4.0 mg/ml having lower viscosity in range of 1.0 cps to 3.0 cps.

Yet another object of the invention is to provide a clear, stable, limpid and easily administrable preferably ready-to-dilute or ready-to-infuse composition comprising Etoricoxib 1.2 mg/ml or Celecoxib 4 mg/ml having viscosity in range of 1.0 cps to 3.

Novel stable clear compositions of the present invention make use of solvent system of solubilizers Transcutol or Tween 80 either singularly or in combination with other solubilizers to prepare parenteral compositions that can be administered by suitable route including IV route.

The invention teaches a stable, clear aqueous composition comprising COX 2 inhibitors or salts thereof 1.2 mg to 4.0 mg/ml, having viscosity in range of 1.0 cps to 3 cps.

There is presented a stable, clear aqueous injectable composition comprising COX 2 inhibitors or salts thereof 1.2 mg to 4.0 mg/ml, having viscosity in range of 1.0 cps to 3 cps, at least two solubilizers optionally a preservative.

There is provided a composition comprising 1.2 to 4 mg/ml of coxib more specifically Celecoxib or Etoricoxib or Parecoxib or Valdecoxib, having a viscosity of 1.0 cps to 3 cps, at least two solubilizers between 4.2% w/v to 18% w/v and at least one excipient selected from solvent/cosolvent, surfactant, preservative, antioxidants, buffer and tonicity modifier.

DETAILED DESCRIPTION OF THE INVENTION

The present invention provides a clear, stable parenteral composition comprising a pharmaceutical active selected from group of Etoricoxib or Celecoxib or other selective COX II inhibitors like Rofecoxib, Parecoxib, Valdecoxib, Firocoxib, Lumiracoxib or salts thereof along with the pharmaceutically acceptable excipients. Ingredients used include but not limited to Diethylene Glycol Monoethyl Ether (Transcutol) or alkyl derivatives thereof, various grades of Glycofurol, conventionally used parenteral grade Monothioglycerol, Glycine, Cyclodextrins, EDTA and alike. Present invention is suitable for administration by multiple routes preferably injectable routes.

The invention provides therapeutically effective amount of Etoricoxib or Celecoxib or other selective COX II inhibitors or salts thereof in an aqueous composition suitable to be administered by multiple routes mainly intramuscular and intravenous and other viz. oral, dermal, subcutaneous, cutaneous, nasal, ocular drops, rectal suppository, vaginal pessaries, intra-articular and otic delivery.

Composition of the present invention is ready-to-dilute or ready-to-infuse pharmaceutical preparation of selective COX 2 inhibitors such as Etoricoxib or Celecoxib or salts thereof in management of musculoskeletal and joint disorders like rheumatoid arthritis, osteoarthritis, ankylosing spondylitis, hemophilic arthropathy painful condition such as acute gout, dysmenorrhoea and some surgical procedures, post operative pain, acute postoperative pain, for treatment of inflammation after surgery.

In particular, the invention provides a composition comprising a pharmaceutical active selected from group of Etoricoxib or Celecoxib or other selective COX II inhibitors or salts thereof in amount ranging from 1.2 mg to 4.0 mg/ml suitable for parenteral routes and using the same liquid with suitable modification for use in ocular preparations.

There is provided a pharmaceutical composition of selective COX 2 inhibitors such as Etoricoxib or Celecoxib or salts thereof, in parenteral form which would be simple and economical.

There is provided a Stable, clear composition comprising active agent from class of COX 2 inhibitors preferably or salts thereof 1.2 mg to 4.0 mg/ml having lower viscosity in range of 1.0 cps to 3.0 cps.

There is provided a stable, clear, transparent composition comprising 1.2 to 4 mg/ml of coxib more specifically Celecoxib or Etoricoxib or Parecoxib or Valdecoxib, having a viscosity of 1.0 cps to 3 cps, at least two solubilizers between 4.2% w/v to 18% w/v and at least one excipient selected from solvent/cosolvent, surfactant, preservative, antioxidants, buffer and tonicity modifier.

As coxibs are poorly soluble or insoluble in water, presence of water has a deterrent effect on its ability to remain in water or to remain stable. Presence of water imparts a tendency to crystallize to coxibs, being poorly soluble. Mixing coxib with pharmaceutically acceptable solvent in presence of water and to stabilize it, is therefore difficult. Either immediately on addition of water or with lapse of time, coxib crystallizes out or it degrades and assay value is lost. Therefore stabilizing a coxib in solution form in aqueous solution is challenge. It was not known in which solvent system huge quantities of coxibs such as 1.2 mg to 4.0 mg/ml can be solubilized and stabilized. Designing a stable composition is therefore a challenge.

The composition can be conveniently prepared using various solvents, co-solvents, solubilizers, anti-oxidants, buffers, chelating agents, complexing agents, pH modifiers, preservatives, tonicity adjusting agents as may be necessary.

Terms Solvents, Cosolvents or solubilizer are used interchangeably. These can be solids or liquids. Solids when present in the form of solution in appropriate solvents also act as solubilizers.

Commonly used solvents such as water, ethanol can be employed to perform the invention. Various types of alcohols can be employed as solubilizers. Alcohols selected from monohydric alcohol or polyhydric alcohols may be employed. An alcohol other than monohydric alcohol is to be interpreted as polyhydric alcohol. Examples of monohydric alcohol are any pharmaceutically acceptable single chain or branched chain alcohol having only one OH group. Suitable examples being ethyl alcohol or benzyl alcohol. Glycerin is example of polyhydric alcohol. There are many other polyhydric alcohols such as polyethylene glycol. Some ether derivatives also act as good solubilizers.

Solubilizers may be selected from but not limited to Transcutol 2 to 50%, PEG 300 up to 50%, PEG 400 up to 20.30%, Polysorbates or Tweens such as Tween 80. It may also comprise solvents like Sesame oil and Soybean oil. Alcohols such as Ethanol are good solubilizer. In accordance with non-limiting embodiment, the concentration of Diethylene Glycol Monoethyl Ether or alkyl derivatives thereof is present in between 0.2%-5% (v/v). When used in the range of 0.2 v/v to 4% v/v it gives better results. It also gives good results when used in the range of 0.2 v/v to 3% v/v. Transcutol is not known to cause any toxicity related issues including irritancy or pain for a therapeutic applications. The safety profile of Transcutol in humans for its use has been exhaustively studied. Its' LD50 in rat through IV route is 4 g/kg, intraperitoneal: mouse LD50 is 2300 mg/kg, subcutaneous: mouse 5500 μl/kg, intravenous: mouse 4300 μl/kg, LD50; intravenous: Dog 3 ml/kg LD50; intravenous: rabbit 2500 μl/kg, LD50; eyes: rabbit 500 mg. Transcutol occurs as colorless and transparent liquid well miscible with water. In the present invention, it is preferable to use Diethylene Glycol Monoethyl Ether having a purity of 99% or higher, more preferably 99.7% of higher and most preferably 99.9% or higher. The density of Transcutol is 0.988. Transcutol makes composition of the present invention less viscous. It enhances and offers an advantage of better absorption of drug in mammals when injected and hence has better pharmacological effect for the intended purpose.

Cyclodextrins (CDs) preferably Beta-cyclodextrins and particularly hydroxyalkyl ether derivatives, preferably hydroxy propyl beta cyclodextrin (HP-β-CD) and sulfobutyl ether beta cyclodextrin (SBE-β-CD) are used in the formulation as solubilizers. As having ability to solubilize the drug in the formulation, cyclodextrins are used in the pharmaceutical formulation to improve drug delivery. Hydroxypropyl Betacylodextrin may comprise in concentration up to 5% w/v and Sulphobutylether Betacylodextrin in concentration up to 5% w/v. When used in the range of 3-4% w/v, good results are produced. They have the ability to form the complex with the active drug; hence the drugs are easily dissolved in the formulation which enhances the drug delivery. Prior art by Hanumegowda U M et al. has reported CDs are shown to improve tolerance and/or reduce local toxicity of several compounds. This protection from local toxicities of compounds likely improves overall tolerability. Betacyclodextrin may be selected from other pharmaceutically acceptable betacyclodextrins. It was surprisingly noticed that when Coxibs, more specifically Etoricoxib, Celecoxib or Paracoxib or Valdecoxib were incorporated in the compositions as taught by the present invention in presence of solubilizers and optionally with other pharmaceutical excipients, result into stable composition and they are able to stabilize 1.2 mg to 4 mg of coxib, more specifically 1.2 mg of Etoricoxib or 4 mg of Celecoxib. These coxibs are not soluble in water other wise.

Hydroxy propyl beta cyclodextrin is same as Hydroxypropyl beta cyclodextrin or Hydroxy propyl betacyclodextrin HP-β-CD or HPBCD or Hydroxyropylbetacyclodextrin.

Glycofurol of various grades such as Glycofurol 75 may also be used as solvent or co-solvent or solubilizer. Up to 5%, it gives satisfactory results. Tweens such as Tween 80 acts as surfactant or solubilizer.

The present invention may also comprise antioxidants selected from but not limited to thioglycerol, acetyl cysteine, butylated hydroxy anisole (BHA) and butylated hydroxy toluene (BHT), ascorbates, ascorbyl palmitate, methyl paraben, propyl paraben, thiomerosal and mixed Tocopheryl ingredient. Further, the invention may also comprise additional excipients like preservatives such as benzalkonium chloride, benzyl alcohol, m-cresol, parabens, phenols, thiomerosal. In another embodiment the composition of present invention may also comprise the stabilizers such as polysorbate 80, l-cysteine, diethanolamine, l-methionine, sodium gluconate, sodium thioglycolate, triethanolamine and oleic acid. These are to be incorporated as per guidelines allowing their incorporation with respect to quantity and applicable specifications known to persons skilled in the art.

The isotony of the composition may be obtained by adding a precisely calculated quantity of isotonicity agent or tonicity adjusting agent selected from sodium chloride, dextrose anhydrous, Glycerin, glucose, mannitol, sorbitol, potassium chloride or calcium chloride, the often preferred isotonic agent being sodium chloride. Present invention enables and provides compositions having osmolality from about less than 80 to about 650 mOsm/kg. The solution isotony is between 270 and 330 mOsm/kg, particularly between 280 and 290 mOsm/kg is desirable. Techniques and processes to adjust the isotonicity or osmolality are known in the art and accordingly isotonicity should be adjusted.

Chelating agent are used in formulation to chelate traces of metallic impurity. Chelating agents that may be used are but not limited to disodium EDTA, sodium EDTA, Calcium disodium EDTA 0.2%, Versetamide 2.54%, Calteridol Calcium 0.023%, also Diethylenetriaminepenta Acetic Acid and ingredients alike can be used as chelating agent.

Antimicrobial preservatives may be selected from but not limited to Benzethonium Chloride 0.01%, Benzyl Alcohol up to 2%, Benzalkonium Chloride 0.02%, Chlorobutanol 2.5 to 5%, m-Cresol 0.1% to 0.3%, Parabens like methyl paraben, propyl paraben up to 1%, phenol up to 0.45%. Some more excipients like 2-PhenoxyEthanol, Phenyl Mercuric Nitrate, Thiomersal and excipients alike or mixtures thereof. Benzyl alcohol acts as solvent also. Permissible quantities of Chelating agents and Antimicrobial preservatives can be selected from inactive ingredients database or such other source.

Suitable surfactants such as Polysorbates/Tweens, sorbitan mono laurate, lecithin, povidone or Other pharmaceutically acceptable surfactants may be used either individually or in combination to prepare compositions of the invention.

A pH close to the physiological one is recommended to minimize pain, irritation, and tissue damage. Buffers optimize solubility and stability by adjusting the pH; however, their strength should be kept as low as possible to avoid pain upon injection.

Examples of pH adjustment agents or buffers that may be employed include but not limited to sodium, potassium or ammonium salt of a weak acid, a tris-(hydroxymethyl)-aminomethane, or Sodium citrate, Sodium phosphate, Sodium Hydroxide, Tris base-65, Tris acetate, Tris HCl-65 or commonly known acetates, citrates, phosphates or a further physiologically active material acting as a buffer such as sodium hydroxide, hydrochloric acid, boric acid, citric acid, acetic acid, phosphoric acid, succinic acid, potassium hydroxide, ammonium hydroxide, magnesium oxide, calcium carbonate, magnesium carbonate, malic acid, potassium citrate, sodium phosphate, lactic acid, gluconic acid, tartaric acid, fumaric acid, diethanolamine, monoethanolamine, sodium carbonate, sodium bicarbonate, triethanolamine, or any combination thereof. The stable aqueous injectable solution may comprise one or more pH adjusting agents in an amount to provide pH of the solution between about 5 and about 8 preferred being between 5 to 7. Buffers are used in sufficient quantity to maintain appropriate pH value during storage.

Chelating agents, antimicrobial agents, pH modifying agents or buffers and surfactants may be employed in permissible quantities as per pharmaceutical guidelines known to persons skilled in the art.

Surprisingly it was noticed that poorly soluble or water insoluble Coxibs provide stale compositions if ingredients are present in some definite proportions and these proportions are novel and non-obvious.

Present invention teaches compositions comprising at least two solubilizers between 4.2% w/v to 19% w/v, preferably between 4.2% to 18% w/v.

It was observed that particular ratios of actives to solubilizers, between different solubilizers play a critical role in preparation of stable parenteral solution of coxibs more specifically Etoricoxib, Celecoxib, Valdecoxib and Paracoxib. The ratio of active to solubilizers between 1:35 to 1:135.71 gives good solubilization of coxib. Satisfactory compositions can be produced wherein ration of active to solubilizer is between 1:35 to 1:58.33. Etoricoxib 1.4 mg ie 0.14% w/v can be solubilized in Twin 80, 8% w/v and Transcutol 3% w/v. It can also be solubilized in Ethanol and Tween 8% w/v each and Transcutol 3% w/v. One can consider it as 3 solubilizers or 2 solubilizers and one solvent.

In one embodiment Celecoxib stable solution was prepared wherein ratio of Celecoxib to solubilizers was 1:27.5. In another embodiment it was between 1:45 to 1:47.5. Several Etoricoxib compositions were prepared and tested for their physical and quality test parameters. Satisfactory results were obtained when ratio of Etoricoxib to solubilizers was between 1:35 to 1:58.33. In yet another embodiment the ratio of Etoricoxib to solubilizers was between 1:78.57 to 1:135.71. Thus the invention provides stable coxib compositions wherein ratio of active to solubilizers between 1:27.5 to 1:135.71 both included.

In another embodiment ratio of solid to liquid solubilizers between 1:1 to 20:1 provided a satisfactory composition. Etoricoxib quantity incorporated was 0.12% w/v.

Coxib to Transcutol ratios between 1:1.66 to 1:25 provided satisfactory compositions. One embodiment comprised of Celecoxib to Transcutol in the ratio of 1:7.5 whereas other embodiments provided satisfactory compositions wherein Etoricoxib to Transcutol ratios were between 1:1.66 to 1:25.

Embodiments exemplified indicate that solubilizers are present from 4.2 to 19% w/v.

Some embodiments wherein ratio of Coxib to HPBCD was 1:25 to 1:33.33 it provided satisfactory stable composition. The ratio of HPBCD can be lowered.

Some embodiments with HPBCD to Transcutol ratio between 1:1 to 20:1 provided satisfactory and stable compositions.

Present invention provides a stable, clear aqueous composition of COX 2 inhibitors or salts thereof comprising 1.2 mg to 4.0 mg/ml of COX 2 inhibitor, having viscosity in range of 1.0 cps to 3 cps, at least two solubilizers between 4.2% w/v to 19% w/v and at least one excipient selected from solvent/cosolvent, surfactant, preservative, antioxidants, buffer and tonicity modifier.

Coxib composition means composition as per present invention comprising COX 2 inhibitor such as Celecoxib, Etoricoxib, Valdecoxib or Parecoxib.

Glycofurol can be used as solubilizer to provide stable solution of coxibs and is part of the invention.

Coxibs being poorly soluble or insoluble in aqueous medium, they tend to crystallize out when cooled or over a period of time. Surprisingly it was found that when more than one solubilizer is used, it kept poorly soluble coxibs in solution over a long period of time and avoided its crystallization.

Further, present invention provides of packaging for the composition comprising pharmaceutical active selected from group of coxibs such as Paracoxib or Celecoxib or Valdecoxib or Etoricoxib or salts thereof ranging equivalent to 1.2 mg to 4.0 mg/ml active moiety which may be available as ready to infuse kit such as bags and glass or plastic bottles preferably of single compartment which may be composed of low density polyethylene (LDPE), high density polyethylene (HDPE), polypropylene (PP) or mixtures of polyethylene and polypropylene. Preferably used glass material may of as cited in USP such as type I glass (borosilicate glass) and type II glass (soda lime glass with chemical surface treatment). In another embodiment, the said composition may be provided in volume of equal or greater than 1 ml to 500 ml of single compartment or ready-to-use injection which can be diluted according to physiological use. Further the kit said herein may be also of flexible bags.

The present invention provides the composition comprising pharmaceutical active selected from group of coxibs such as Paracoxib or Celecoxib or Etoricoxib or salts thereof ranging from 1.2 mg to 4.0 mg/ml in which rubber stoppers, closures or disc seals, screw-caps or cap-stopper combination seals closures may be used as a component of packaging.

The pharmaceutical composition comprising a pharmaceutical active selected from group of coxibs such as paracoxib or Etoricoxib and Celecoxib are present in amount ranging from 1.2 mg to 4.0 mg/ml. are subjected to sterilization process to achieve the sterile compositions. The formulation is prepared and filled in article and is terminally sterilized by electron beam irradiation such as γ-irradiation, natural light, microwave heat viz. moist heat sterilization, dry heat sterilization. Autoclave sterilization may be preferred to achieve moist heat sterilization of the drug after final packaging. Typical cycle of autoclave in the pharmaceuticals to attain the sterilization of the final product is 121° C. for 15 minutes.

Compositions of the present invention can be autoclaved at temperature ranging from 110° C. to 130° C., preferably 115° C. to 125° C. for period of time ranging from 5 minutes to 30 minutes, preferably 10 minutes to 20 minutes. More preferably the autoclaving is done at 120° C. to 122° C. for 15 minutes.

Compositions of the present invention ie of Etoricoxib and Celecoxib after sterilization were stored at different stability conditions as per the pharmaceutical stability guidelines for stability. Both the sterile products are stable at least for the period of six months at accelerated storage conditions.

The invention provides an accurate dose of pharmaceutical composition comprising a pharmaceutical active selected from group of Etoricoxib and Celecoxib present in amount ranging from 1.2 mg to 4.0 mg/ml suitable for parenteral routes especially ready-to-use or ready-to-infuse and using the same liquid with suitable modification for use in ocular preparations.

In another embodiment, composition is having pH ranging from 5.00 to 7.00 and viscosity is in between 1.0 cps to 3.0 cps.

Novelty of the present invention resides in providing stable compositions solubilizing huge amounts of Cox 2 inhibitors which are otherwise not soluble in aqueous media and tend to precipitate in presence of water. Novelty also resides in ability of the compositions to keep the active Cox 2 in solution even when diluted with aqueous media. Novelty also resides in providing stable clear compositions with lower viscosity, causing less pain, fit for parenteral route.

Nonobviousness of the present invention resides in the fact that clear, stable aqueous compositions comprising 1.2 mg to 4.0 mg/ml of Cox 2 inhibitors were not provided by prior art and were not imagined by the prior art. Nonobviousness and novelty also resides in the fact that present inventions dissolves water insoluble active ingredient like Celecoxib or Etoricoxib in the range of 1.2 mg to 4.0 mg/ml yet resulting into solution of viscosity of about 1.0 cps to 3.0 cps.

Coxibs means COX 2 inhibitors. Pharmaceutical preparation and pharmaceutical composition or pharmaceutical formulation mean one and the same and are interchangeable. Utility and non-obviousness of the present invention resides in the fact that solution of Cox 2 inhibitor prepared as per present invention can be formulated for administration by injection, oral, topical application route. Novelty and industrial application of the invention also resides in the fact that for the first time there is provided an IV solution that can be administered over a prolonged period. None of the prior arts provides any motivation to prepare the compositions as described by the present invention. Prior art has not provided slightest guidance or hint to prepare an IV composition as taught by the present invention.

Compositions of the present invention are suitable to be presented in dosage form for parenteral or topical or injectable or oral or nasal or per oral or any other route of administration. The invention is illustrated in the examples stated below.

EXAMPLES

Example 1: Celecoxib 4.00 mg/ml Formula and Manufacturing Procedure

| Sr. No. | Ingredients | Qty/mL |
| --- | --- | --- |
| 1. | Celecoxib | 0.4% w/v (4.00 mg) |
| 2. | Ethanol | 10.0% w/v |
| 3. | Tween 80 | 8.0% w/v |
| 4. | Water for Injection | q.s to 1 Lit | a. In a 2.0 L beaker poured dispensed quantity of Ethanol and dissolved dispensed quantity of drug. Ensured that solution was clear.
b. Added Tween 80 to solution obtained in step a. under continuous stirring.
c. Made final volume with WFI up to 1.0 L in Volumetric Flask of 1000 mL.
d. Continued Nitrogen Purging with continuous stirring by magnetic stirrer.
e. Filled in USP Type-1 10 mL amber color glass vial and USP Type-1 10 mL clear glass vial and were terminally sterilized in autoclave at 121° C. for 15 minutes.

Example 2: Stability Details of Example 5 at the End of 6 Months i. For composition filled in USP type-1 10 mL amber color glass vial:

| Test | Initial | 40 ± 2° C./ 75% ± 5% RH 6 M | 25 ± 2° C./ 60% ± 5% RH 6 M | 30 ± 2° C./ 65% ± 5% RH 6 M | 30 ± 2° C./ 75% ± 5% RH 6 M |
| --- | --- | --- | --- | --- | --- |
| Description | Light yellow color | Complies | Complies | Complies | Complies |

|  | Test | Initial | 40 ± 2° C./ 75% ± 5% RH 6 M | 25 ± 2° C./ 60% ± 5% RH 6 M | 30 ± 2° C./ 65% ± 5% RH 6 M | 30 ± 2° C./ 75% ± 5% RH 6 M |
|---|---|---|---|---|---|---|
|  | pH | 7.0 | 7.04 | 7.13 | 7.05 | 7.07 |
|  | Assay | 102.1% | 98.25% | 99.75% | 99.50% | 98.75% |
| RS | SI | ND | 0% | 0% | 0% | 0% |
|  | TI | ND | 0% | 0% | 0% | 0% | ii. For composition filled in USP type-1 10 mL Clear glass vial:

|  | Test | Initial | 40 ± 2° C./ 75% ± 5% RH 6 M | 25 ± 2° C./ 60% ± 5% RH 6 M | 30 ± 2° C./ 65% ± 5% RH 6 M | 30 ± 2° C./ 75% ± 5% RH 6 M |
|---|---|---|---|---|---|---|
|  | Description | Light yellow color | Complies | Complies | Complies | Complies |
|  | pH | 7.0 | 7.00 | 7.06 | 7.03 | 7.02 |
|  | Assay | 101.87% | 98.75% | 100.00% | 99.50% | 99.25% |
| RS | SI | ND | 0% | 0% | 0% | 0% |
|  | TI | ND | 0% | 0% | 0% | 0% |

Above data depicts a stable composition at above mentioned stability conditions.

Example 3: Celecoxib 4.00 mg/ml. Formula and Manufacturing Procedure

| Sr. No. | Ingredients | Qty/mL |
|---|---|---|
| 1 | Celecoxib | 0.4% w/v (4.00 mg) |
| 2 | Ethanol | 8.0% w/v |
| 3 | Tween 80 | 8.0% w/v |
| 4 | Transcutol-HP | 3.0% w/v |
| 5 | Water for Injection | q.s to 1 Lit | a. In a 2.0 L beaker poured dispensed quantity of Ethanol, Transcutol-HP and dissolved dispensed quantity of drug. Ensured that solution was clear.
b. Added Tween 80 to solution obtained in step a. under continuous stirring.
c. Made final volume with WFI up to 1.0 L in Volumetric Flask of 1000 mL.
d. Continued Nitrogen Purging with continuous stirring on magnetic stirrer.
e. Filled in USP Type-1 5 mL clear glass vial.
f. Filled samples were terminally sterilized in autoclave at 121° C. for 15 min.

Example 4: Stability Details of Example 3 in Clear 5 ml Glass Vial

| Test | Initial | 40 ± 2° C./ 75% ± 5% RH 6 M | 25 ± 2° C./ 60% + 5% RH 12 M | 30 ± 2° C./ 65% + 5% RH 12 M | 30 ± 2° C./ 75% ± 5% RH 12 M |
|---|---|---|---|---|---|
| Description | Light yellow color | Clear yellow liquid solution | Clear yellow liquid solution | Clear yellow liquid solution | Clear yellow liquid solution |
| pH | 6.98 | 6.76 | 7.08 | 7.05 | 7.02 |
| % Assay | 102.96 | 99.35 | 101.75 | 102.75 | 102.25 |
| Impurities | 0 | 0 | 0 | 0 | 0 |

Example 5

Etoricoxib Infusion 1.2 mg/mL, Batch No: EIF-1903, Batch size: 250 mL

| Ingredient | Ph. Specs | Qty/ml | Qty/batch |
|---|---|---|---|
| Etoricoxib | IH | 1.2 mg or 0.12% w/v | 300 mg |
| HPβCD | IH | 4% w/v | 10 gm |
| Transcutol HP | BP/EP | 0.3% w/v | 0.75 mL |
| Monothioglycerol | USP | 2.5 mg or 0.25% w/v | 0.625 g |
| Water for injection | IH | Qs to 1 mL | Qs to 250 ml |
| Primary Packing Details | | | |
| 5 mL clear glass vials with Bromobutyl rubber stopper and Plain Aluminum seal | | | 50 NOS |

Manufacturing Procedure:

(A) Preparation of Drug, Transcutol & Monothioglycerol Solution

Taken dispensed quantity of Transcutol HP, Monothioglycerol and added dispensed quantity of drug and mixed well.

(B) Preparation of HPBCD Solution

Taken 100 mL of water for Injection and added dispensed quantity of HPBCD, mixed well to form a clear solution (C) Addition of A & B Added slowly solution B into solution A and mixed well for 30 minutes. Then made up the volume up to 250 ml with continuous stirring with water for injection and stirred about 3 Hour with fast stirring (about 900 rpm). Viscosity: 1.164 (Ostwald Viscometer Type A), Wt/mL: 1.0128, pH: 6.68, Osmolality: 63 mosm/kg.

Example 6

Stability of Batch No: EIF-1903 produced as per example 5 was studied at different temp and humidity conditions ie 40° C. and 75% RH, 30° C. and 75% RH and 25° C. and 60% RH. Data on Stability conditions of 40° C. and 75% RH, 30° C. and 75% RH is listed below. These are more corrosive and harsh conditions than 25° C. and 60% RH. The product was found stable in all three conditions. RS were within the limits. Above stated results depict a stable clear colourless liquid composition of Etoricoxib. Etoricoxib Infusion 1.2 mg/mL.

| Tests | Initial | 40° C./75% RH 6 M | 30° C./65% RH 9 M | 25° C./30% RH 9 M |
| --- | --- | --- | --- | --- |
| Description | Clear colorless solution | Complies | Complies | Complies |
| pH pH 5.0-7.0 | 6.68 | 5.88 | 5.69 | 6.51 |
| Assay: Each ml contains: 1.2 mg/mL (90.0% to 110.0%) | 99.16% | 98.38% | 98.34% | 98.60% |

Example 7

Batch No: EIF-1904; Batch size: 250 mL; Each ml contains: Etoricoxib—1.2 mg

| Ingredient | Ph. Specs | Qty/ml | Qty/batch |
| --- | --- | --- | --- |
| Etoricoxib | IH | 1.2 mg or 0.12% w/v | 300 mg |
| HPβCD | IH | 4% w/v | 10 gm |
| Transcutol HP | BP/EP | 2% v/v | 5 mL |
| Monothioglycerol | USP | 2.5 mg w/v or 0.25% w/v | 0.625 g |
| Water for injection | IH | Qs to 1 mL | Qs to 250 ml |
| 5 mL clear glass vials with Bromobutyl rubber stopper and Plain Aluminum seal | | | 50 NOS |

Example 8

Stability testing results of Etoricoxib Infusion 1.2 mg/mL, Batch No: EIF-1904

| Tests | Initial | 40° C./75% RH 6 M | 30° C./65% RH 9 M | 25° C./30% RH 9 M |
| --- | --- | --- | --- | --- |
| Description | Clear colorless solution | Complies | Complies | Complies |
| pH 5.0-7.0 | 6.52 | 5.74 | 5.96 | 6.13 |
| Assay: Each ml contains: 1.2 mg/mL (90.0% to 110.0%) | 98.34% | 98.70% | 98.48% | 97.84% |

RS were within limits.

Example 9

Batch No: EIF-1906; Batch size: 250 mL, Each ml contains: Etoricoxib—1.2 mg

| Ingredient | Ph. Specs | Qty/ml | Qty/batch |
| --- | --- | --- | --- |
| Etoricoxib | IH | 1.2 mg or 0.12% w/v | 300 mg |
| HPβCD | IH | 4% w/v | 10 gm |
| Transcutol HP | BP/EP | 0.2% v/v | 0.5 mL |
| Monothioglycerol | USP | 2.5 mg or 0.25% w/v | 0.625 g |
| Water for injection | IP/BP/USP | Qs to 1 mL | Qs to 250 ml |
| 5 mL clear glass vials with Bromobutyl rubber stopper and Plain Aluminum seal | | | 50 NOS |

Example 10

Stability of composition in Example 9 Etoricoxib Infusion 1.2 mg/mL, Batch No: EIF-1906

| Tests | Initial | 40° C./75% RH 6 M | 30° C./65% RH 9 M | 25° C./60% RH 9 M |
| --- | --- | --- | --- | --- |
| Description | Clear colorless solution | Complies | Complies | Complies |
| pH 5.0-7.0 | 6.60 | 5.90 | 5.88 | 6.25 |
| Assay: Each ml contains: 1.2 mg/mL (90.0% to 110.0%) | 97.45% | 97.99% | 97.27% | 97.56% |

RS were within limits.

Example: 11

Batch No: EIF-2001; Batch size: 50 mL; Each ml contains: Etoricoxib—1.2 mg

| Ingredient | Ph. Specs | Qty/ml | Qty/batch |
|---|---|---|---|
| Etoricoxib | IH | 1.2 mg or 0.12% w/v | 60 mg |
| HPβCD | IH | 4% w/v | 2 gm |
| Transcutol HP | BP/EP | 0.3% v/v | 0.15 Ml |
| Sodium Chloride | IP | 0.6% w/v | 0.3 g |
| Monothioglycerol | USP | 2.5 mg or 0.25% w/v | 0.125 g |
| Water for injection | IH | Qs to 1 mL | Qs to 50 ml |
| 10 mL clear glass vials with Bromobutyl rubber stopper and Plain Aluminum seal | | | 5 NOS |

Manufacturing Procedure:
(A) Preparation of Drug, Transcutol & Monothioglycerol Solution
Taken dispensed quantity of Transcutol HP, Monothioglycerol and add dispensed quantity of drug and mixed well.
(B) Preparation of HPBCD and Sodium Chloride Solution
Taken approx 20 mL water for injection and added dispensed quantity of sodium chloride, mixed well to form a clear solution then added dispensed quantity of HPBCD in above solution, mixed well to form a clear solution
(D) Addition of A & B
Added slowly solution B into solution A and mixed well for 30 minutes. Then made up the volume up to 50 ml with continuous stirring with water for injection and stirred for about 3 Hours with fast stirring (approx 900 rpm).
Initial pH: 6.52; Osmolality: 299 mosm/kg Example 12

Batch No: ETS-1716; Batch size: 250 ml
Each ml contains: Etoricoxib—1.20 mg

| Ingredient | Qty/ml | Qty/batch |
|---|---|---|
| Etoricoxib | 1.20 mg or 0.12% w/v | 300.8 mg |
| Hydroxypropyl Betacylodextrin (HPBCD) | 3% w/v | 7.5 g |
| Transcutol HP | 3% v/v | 7.5 ml |
| Sodium chloride | 9 mg or 0.9% w/v | 2.25 g |
| Monothiglycerol | 2.5 mg or 0.25% w/v | 0.625 g |
| Water for injection | Qs to 1 ml | Qs to 250 ml (approx 97.0%) |

Assay of Etoricoxib raw material: 100% & LOD 0.27%
Manufacturing Procedure:
(A) Preparation of Sodium Chloride & Hydroxy Propyl Beta Cyclodextrin Solution
Taken 50 ml water for injection in glass beaker. Added slowly dispensed quantity of Sodium chloride under stirring to get a clear solution and added hydroxyl propyl betacyclodextrin (HPBCD) in above solution under continuous stirring to get a clear solution. Checked the clarity of solution.
(B) Preparation of Drug Solution:
Taken a 7.5 ml transcutol HP in another glass beaker. Slowly added dispensed quantity of monothioglcerol. Mixed well. Slowly added dispensed quantity of Etoricoxib under continuous stirring to get a clear solution. Checked the clarity of solution.
(C) Addition of Sodium Chloride & Hydroxy Propyl Beta Cyclodextrin Solution in Drug Solution.
Added sodium chloride and hydroxyl propyl betacyclodextrin (HPBCD) solution in drug solution with continuous stirring and nitrogen bubbling to make complex with each other for 10 minutes. A clear solution is obtained. Checked the clarity of solution.
(D) Make Up the Final Volume
Made up the final volume with water for injection up to 250 ml & stirred for 20-25 minutes under nitrogen purging. Checked the clarity of solution. Filtered and filled in 5.0 ml clear glass vials. usp type I, Bromobutyl rubber stopper & aluminum seal.
Ostwald viscometer: Bulb type B (viscosity range 1 to 10 cps)
Weight per mL=1.011 g/ml, Viscosity; 1.146 cps Example 13

Batch No: ETS-1716, Etoricoxib Infusion 1.2 mg/ml; Batch size: 250 ml; Strength: 1.2 mg/ml; Pack size: 5 ml

| Tests | Initial | 40° C./ 75% RH/ 6 M | 25° C./ 60% RH/ 6 M | 30° C./ 75% RH/ 6 M |
|---|---|---|---|---|
| Description | Clear colourless | Complies | Complies | Complies |
| pH 5-7 | 6.80 | 6.15 | 6.60 | 5.27 |
| Assay Etoricoxib 1.2 mg/ml (90% to 110%) | 100.60% | 98.33 | 98.33 | 99.17 |
| Related Substances | | | | |
| Impurity-I NMT 1.0% | 0.00% | 0.00% | 0.00% | 0.00% |
| Impurity-II NMT 1.0% | 0.00% | 0.00% | 0.00% | 0.00% |
| Impurity-III NMT 1.0% | 0.00% | 0.00% | 0.00% | 0.00% |
| Impurity-IV NMT 1.0% | 0.10% | 0.12% | 0.12% | 0.12% |
| Individual Imp: NMT 0.5% | 0.05% | 0.00% | 0.00% | 0.00% |
| Total Impurity NMT = 2.0% | 0.15% | 0.12% | 0.12% | 0.12% |
| Viscosity (cps) | 1.146 | — | — | — |

Example 14

Batch No: ETS-1717, Batch size: 250 ml; Each ml contains: Etoricoxib—1.20 mg

| Ingredient | Qty/ml | Qty/batch |
|---|---|---|
| Etoricoxib | 1.20 mg or 0.12% w/v | 300.81 mg |
| Hydroxypropyl Betacylodextrin (HPBCD) | 3% w/v | 7.5 g |
| Transcutol HP | 3% v/v | 7.5 ml |
| Dextrose anhydrous | 50 mg or 5% w/v | 12.5 g |
| Monothiglycerol | 2.5 mg or 0.25% w/v | 0.625 g |
| Water for injection | Qs to 1 ml | Qs to 250 ml (approx 95.0%) |

Assay of Etoricoxib raw material: 100% & LOD 0.27%
Manufacturing Procedure:
(A) Preparation of Dextrose Anhydrous & Hydroxy Propyl Beta Cyclodextrin Solution
Taken 50 ml water for injection in glass beaker. Added slowly dispensed quantity of Dextrose anhydrous under stirring to get a clear solution. Added hydroxyl propyl betacyclodextrin (HPBCD) in above solution under continuous stirring to get a clear solution. Checked the clarity of solution.

(B) Preparation of Drug Solution:

Taken a 7.5 ml transcutol HP in another glass beaker. Added slowly dispensed quantity of monothioglcerol. Mixed well. Added slowly dispensed quantity of Etoricoxib under continuous stirring to get a clear solution. Checked the clarity of solution.

(C) Addition of Dextrose Anhydrous and Hydroxy Propyl Beta Cyclodextrin Solution in Drug Solution.

Added Dextrose and hydroxyl propyl betacyclodextrin (HPBCD) solution in drug solution under continuous stirring and nitrogen bubbling to make complex with each other for 10 minutes. A clear solution is obtained. Checked the clarity of solution.

(D) Make Up the Final Volume

Made up the final volume with water for injection up to 250 ml. Stirred for 20-25 minutes under nitrogen purging. Checked the clarity of solution. Filtered solution. Filled in 5.0 ml clear glass vials. usp type I, bromobutyl rubber stopper & aluminum seal.

Ostwald viscometer: Bulb type B (viscosity range 1 to 10 cps): Viscosity; 1.215 cps Weight per mL=1.016 g/ml pH: 6.64; Osmolarity Result: 636 mOsmol/kg Example 15: Stability Testing of Batch ETS-1717

| Tests | Initial | 40° C./75% RH/6 M | 25° C./60% RH/6 M | 30° C./75% RH/6 M |
|---|---|---|---|---|
| Description | Clear colourless solution | Complies | Complies | Complies |
| pH 5-7 | 6.64 | 6.63 | 5.83 | 6.23 |
| Assay Etoricoxib 1.2 mg/ml | 100.28% | 98.33 | 99.17 | 98.33 |
| Related Substances | | | | |
| Impurity-I NMT 1.0% | 0.00% | 0.00% | 0.00% | 0.00% |
| Impurity-II NMT 1.0% | 0.00% | 0.00% | 0.00% | 0.00% |
| Impurity-III NMT 1.0% | 0.00% | 0.00% | 0.00% | 0.00% |
| Impurity-IV NMT 1.0% | 0.12% | 0.12% | 0.12% | 0.12% |
| Individual Imp: NMT 0.5% | 0.05% | 0.00% | 0.00% | 0.00% |
| Total Impurity NMT = 2.0% | 0.15% | 0.12% | 0.12% | 0.12% |
| Viscosity (cps) | 1.215 | — | — | — |

Sterile composition can be prepared by aseptic filling or by terminal sterilization as described in the detailed description and by sterilization methods known in art.

Example 16

Batch No: ETS-1718, Batch size: 250 ml; Each ml contains: Etoricoxib—1.20 mg

| Ingredient | Qty/ml | Qty/batch |
|---|---|---|
| Etoricoxib | 1.20 mg or 0.12% w/v | 300.81 g |
| Hydroxypropyl Betacylodextrin (HPBCD) | 4% w/v | 10 g |
| Transcutol HP | 3% v/v | 7.5 ml |
| Dextrose anhydrous | 50 mg or 5% w/v | 5.0 g |
| Monothiglycerol | 2.5 mg or 0.25% w/v | 250 mg |
| Water for injection | Qs to 1 ml | Qs to 250 ml (approx 99.5%) |

Assay of Etoricoxib raw material: 100% & LOD 0.27%

Manufacturing Procedure:

(A) Preparation of Dextrose Anhydrous & Hydroxy Propyl Beta Cyclodextrin Solution Taken 50 ml water for injection in glass beaker. Added slowly, dispensed quantity of Dextrose anhydrous under stirring to get a clear solution. Added hydroxyl propyl betacyclodextrin (HPBCD) in above solution under continuous stirring to get a clear solution. Checked the clarity of solution.

(B) Preparation of Drug Solution:

Taken 7.5 ml transcutol HP in another glass beaker. Added slowly, dispensed quantity of monothioglcerol and mixed well. Slowly added dispensed quantity of Etoricoxib under continuous stirring to get a clear solution. Checked the clarity of solution.

(C) Addition of Dextrose Anhydrous & Hydroxy Propyl Beta Cyclodextrin Solution in Drug Solution.

Added Dextrose and hydroxyl propyl betacyclodextrin (HPBCD) solution in drug solution under continuous stirring and nitrogen bubbling to make complex with each other for 10 minutes. A clear solution is obtained. Checked the clarity of solution.

(D) Make Up the Final Volume

Made up the volume with water for injection up to 250 ml. Stirred for 20-25 minutes under nitrogen purging. Checked the clarity of solution. Filtered solution. Filled in 5.0 ml clear glass vials usp type I, bromobutyl rubber stopper and aluminum seal.

Ostwald viscometer: Bulb type B (viscosity range 1 to 10 cps): Viscosity; 1.158 cps Weight per mL=1.018 g/ml; pH: 6.80: Osmolarity Result: 684 mOsmol/kg Example 17

Batch No: ETS-1718: Strength: 1.2 mg/ml: Batch size: 250 ml (Non sterile batch)

| Tests | Initial | 40° C./75% RH/6 M | 25° C./60% RH/6 M | 30° C./75% RH/6 M |
|---|---|---|---|---|
| Description | Clear colourless solution | Complies | Complies | Complies |
| pH 5-7 | 6.80 | 6.21 | 6.19 | 5.95 |
| Assay Etoricoxib 1.2 mg/ml (90% to 110%) | 101.65% | 98.33 | 99.17 | 98.33 |
| Related Substances (As per kekule API method) | | | | |
| Impurity-I NMT 1.0% | 0.00% | 0.00% | 0.00% | 0.00% |
| Impurity-II NMT 1.0% | 0.00% | 0.00% | 0.00% | 0.00% |

-continued

| Tests | Initial | 40° C./75% RH/6 M | 25° C./60% RH/6 M | 30° C./75% RH/6 M |
|---|---|---|---|---|
| Impurity-III NMT 1.0% | 0.00% | 0.00% | 0.00% | 0.00% |
| Impurity-IV NMT 1.0% | 0.10% | 0.13% | 0.12% | 0.12% |
| Individual Imp: NMT 0.5% | 0.05% | 0.00% | 0.00% | 0.00% |
| Total Impurity NMT = 2.0% | 0.15% | 0.13% | 0.12% | 0.12% |
| Viscosity in cps | 1.158 | — | — | — |

Example 18

Batch No: ETS-1719; Batch size: 250 ml; Each ml contains: Etoricoxib—1.20 mg

| Ingredient | Qty/ml | Qty/batch |
|---|---|---|
| Etoricoxib | 1.20 mg or 0.12% w/v | 300.81 mg |
| Hydroxypropyl Betacylodextrin (HPBCD) | 4% w/v | 10 g |
| Transcutol HP | 3% w/v | 7.5 ml |
| Sodium chloride | 9 mg or 0.9% w/v. | 2.25 g |
| Monothiglycerol | 2.5 mg or 0.25% w/v | 0.625 g |
| Water for injection | Qs to 1 ml | Qs to 250 ml (approx 95.0%) |

Assay of Etoricoxib raw material: 100% & LOD 0.27%
Manufacturing Procedure:
(A) Preparation of Sodium Chloride and Hydroxy Propyl Beta Cyclodextrin Solution
  Taken 50 ml water for injection in glass beaker. Slowly added dispensed quantity of Sodium chloride under stirring to get a clear solution. Added hydroxyl propyl betacyclodextrin (HPBCD) in above solution under continuous stirring to get a clear solution. Checked the clarity of solution.
(B) Preparation of Drug Solution:
  Taken 7.5 ml Transcutol HP in another glass beaker. Slowly added dispensed quantity of Monothioglycerol. Mixed well. Slowly added dispensed quantity of Etoricoxib under continuous stirring to get a clear solution. Checked the clarity of solution.
(C) Addition of Sodium Chloride & Hydroxy Propyl Beta Cyclodextrin Solution in Drug Solution.
  Added sodium chloride and hydroxyl propyl betacyclodextrin (HPBCD) solution in drug solution under continuous stirring and nitrogen bubbling to make complex with for 10 minutes. A clear solution is obtained. Checked the clarity of solution.
(D) Make Up the Final Volume
  Made up the final volume with water for injection up to 250 ml. Stirred for 20-25 minutes under nitrogen purging. Checked the clarity of solution. Filtered and filled in 5.0 ml clear glass vials. usp type I, bromobutyl rubber stopper & aluminum seal.
  Ostwald viscometer: Bulb type B (viscosity range 1 to 10 cps): Viscosity; 1.176 cps
  Weight per mL=1.012 g/ml; pH: 6.36: Osmolarity Result: 620 mOsmol/kg Example 19: Stability of Composition Exemplified in Example 19. (Non Sterile Batch)

| Tests | Initial | 40° C./75% RH/6 M | 25° C./60% RH/6 M | 30° C./75% RH/6 M |
|---|---|---|---|---|
| Description | Clear colourless | Complies | Complies | Complies |
| pH 5-7 | 6.36 | 6.38 | 5.96 | 6.18 |
| Assay Etoricoxib 1.2 mg/ml (90% to 110%) | 101.60% | 99.17 | 100.00 | 99.17 |
| Related Substances | | | | |
| Impurity-I NMT 1.0% | 0.00% | 0.00% | 0.00% | 0.00% |
| Impurity-II NMT 1.0% | 0.00% | 0.00% | 0.00% | 0.00% |
| Impurity-III NMT 1.0% | 0.00% | 0.00% | 0.00% | 0.00% |
| Impurity-IV NMT 1.0% | 0.10% | 0.12% | 0.12% | 0.12% |
| Individual Imp: NMT 0.5% | 0.04% | 0.00% | 0.00% | 0.00% |
| Total Impurity NMT = 2.0% | 0.14% | 0.12% | 0.12% | 0.12% |
| Viscosity | 1.176 cps | — | — | — |

Example 20

Batch No: ETS-1720; Batch size: 250 ml; Each ml contains: Etoricoxib—1.20 mg

| Ingredient | Qty/ml | Qty/batch |
|---|---|---|
| Etoricoxib | 1.20 mg or 0.12% w/v | 300.81 mg |
| Hydroxypropyl Betacylodextrin (HPBCD) | 4% w/v | 10 g |
| Transcutol HP | 3% w/v | 7.5 ml |
| Monothiglycerol | 2.5 mg or 0.25% w/v | 0.625 g |
| Water for injection | Qs to 1 ml | Qs to 250 ml |

Assay of Etoricoxib raw material 100% & LOD 0.27%
Manufacturing Procedure:
(A) Preparation of Hydroxy Propyl Beta Cyclodextrin Solution
  Taken 25 ml water for injection in glass beaker. Slowly added dispensed quantity of hydroxyl propyl betacyclodextrin (HPBCD) under continuous stirring to get a clear solution. Checked the clarity of solution.
(B) Preparation of Drug Solution:
  Taken 7.5 ml Transcutol HP in another glass beaker. Slowly added dispensed quantity of Etoricoxib under continuous stirring to get a clear solution. Checked the clarity of solution.
(C) Addition of Hydroxypropyl Betacyclodextrin Solution in Drug Solution.
  Added Hydroxyl propyl betacyclodextrin (HPBCD) solution in drug solution under continuous stirring and nitrogen bubbling to prepare a complex, for 10 minutes. A clear solution is obtained. Checked the clarity of solution.
(D) Make Up the Final Volume
  Made up volume with water for injection up to 250 ml. Stirred for 20-25 minutes under nitrogen purging.

Checked the clarity of solution. Filtered and filled in 5.0 ml clear glass vials. usp type I, bromobutyl rubber stopper & aluminum seal.

Ostwald viscometer: Bulb type B (viscosity range 1 to 10 cps) Viscosity; 1.176 cps Weight per mL=1.012 g/ml. pH: 6.36. Osmolarity Result: 286 mOsmol/kg Example 21: Stability of Composition in Example 21, Batch No: ETS-1720; Etoricoxib Infusion 1.2 mg/Ml; (Non Sterile Batch)

| Tests | Initial | 40° C./75% RH/6 M | 25° C./60% RH/6 M | 30° C./75% RH/6 M |
|---|---|---|---|---|
| Description | Clear colourless solution | Complies | Complies | Complies |
| pH 5-7 | 6.36 | 6.43 | 6.47 | 6.25 |
| Assay Etoricoxib 1.2 mg/ml (90% to 110%) | 99.38% | 98.33 | 100.00 | 99.17 |
| Related Substances | | | | |
| Impurity-I NMT 1.0% | 0.00% | 0.00% | 0.00% | 0.00% |
| Impurity-II NMT 1.0% | 0.00% | 0.00% | 0.00% | 0.00% |
| Impurity-III NMT 1.0% | 0.00% | 0.00% | 0.00% | 0.00% |
| Impurity-IV NMT 1.0% | 0.10% | 0.12% | 0.14% | 0.14% |
| Individual Imp: NMT 0.5% | 0.04% | 0.00% | 0.00% | 0.00% |
| Total Impurity NMT = 2.0% | 0.15% | 0.12% | 0.14% | 0.14% |
| Viscosity | 1.176 cps | — | — | — |

Example 22

Batch No: ETS-1802; Batch size: 250 ml; Each ml contains: Etoricoxib—1.20 mg

| Ingredient | Qty/ml | Qty/batch |
|---|---|---|
| Etoricoxib | 1.20 mg or 0.12% w/v | 300.81 mg |
| Hydroxypropyl Betacyclodextrin (HPBCD) | 3% w/v | 7.5 g |
| Transcutol HP | 3% w/v | 7.5 ml |
| Monothiglycerol | 2.5 mg or 0.25% w/v | 0.625 g |
| Water for injection | Qs to 1 ml | Qs to 250 ml (approx 95.0%) |

Assay of Etoricoxib raw material 100% & LOD 0.27%

Manufacturing Procedure:

(A) Preparation of Hydroxy Propyl Beta Cyclodextrin Solution

Taken 25 ml water for injection in glass beaker. Slowly added dispensed quantity of hydroxyl propyl betacyclodextrin (HPBCD) under continuous stirring to get a clear solution. Checked the clarity of solution.

(B) Preparation of Drug Solution:

Taken a 7.5 ml transcutol HP in another glass beaker. Slowly added dispensed quantity of Etoricoxib under continuous stirring to get a clear solution. Checked the clarity of solution.

(C) Addition of Hydroxypropyl Betacyclodextrin Solution in Drug Solution.

Added Hydroxyl propyl betacyclodextrin (HPBCD) solution in drug solution with under continuous stirring and nitrogen bubbling to make complex, for 10 minutes. A clear solution is obtained. Checked the clarity of solution.

(D) Make Up the Final Volume

Made up the final volume with water for injection up to 250 ml. Stirred for 20-25 minutes under nitrogen purging. Checked the clarity of solution. Filtered and filled in 5.0 ml clear glass vials. usp type I, bromobutyl rubber stopper & aluminum seal.

Ostwald viscometer: Bulb type B (viscosity range 1 to 10 cps); Viscosity; 1.176 cps Weight per mL=1.012 g/ml; pH: 6.14

Example 23

Batch No: ETS-1802; Etoricoxib Infusion 1.2 mg/ml; (Non sterile batch);

| Tests | Initial | 40° C./75% RH/6 M | 25° C./60% RH/6 M | 25° C./60% RH/9 M | 30° C./65% RH/9 M |
|---|---|---|---|---|---|
| Description | Clear and colourless solution | Clear and colourless solution | Clear and colourless solution | Clear and colourless solution | Clear and colourless solution |
| pH 5-7 | 6.14 | 6.45 | 5.56 | 5.62 | 5.41 |
| Assay Etoricoxib 1.2 mg/ml (90% to 110%) | 98.19 | 97.50 | 98.33 | 95.44 | 95.48 |
| Related Substances | | | | | |
| Impurity-I NMT 1.0% | 0.00 | 0.00% | 0.00% | 0.00% | 0.00% |
| Impurity-II NMT 1.0% | 0.00 | 0.00% | 0.00% | 0.00% | 0.00% |
| Impurity-III NMT 1.0% | 0.00 | 0.00% | 0.00% | 0.00% | 0.00% |
| Impurity-IV NMT 1.0% | 0.14 | 0.19% | 0.16% | 0.15% | 0.15% |
| Individual Imp: NMT 0 5% | 0.00 | 0.00% | 0.00% | 0.00% | 0.00% |
| Total Impurity NMT = 2.0% | 0.14 | 0.169 | 0.16% | 0.15% | 0.15% |
| Viscosity 9 cps) | 1.176 | — | — | | |

Example 24

Batch No.: Trial-01; Batch size: 50 mL

| No. | Ingredients | Qty/mL | Qty/Batch |
|---|---|---|---|
| 1 | Etoricoxib | 1.4 mg | 70 mg |
| 2 | Ethanol | 8.0% v/v | 4 ml |
| 3 | Tween 80 | 8.0% w/v | 4.00 g |
| 4 | Transcutol HP | 3.0% v/v | 1.50 mL |
| 5 | Water for Injection | q.s | q.s. to 50 mL |

Procedure:
1) In a 100 mL beaker poured dispensed quantity of Ethanol and dissolved dispensed quantity of drug. Ensured that solution is clear.
2) Added Tween 80 to above solution under continuous stirring.
3) Added to Transcutol HP above solution under continuous stirring.
4) Made final volume with WFI up to 50 mL in Volumetric Flask of 50 mL.
5) Continued stirring on magnetic stirrer for 30 minutes.

Example 25

Batch No.: Trial-04; Batch size: 50 mL

| No. | Ingredients | Qty/mL | Qty/Batch |
|---|---|---|---|
| 1 | Etoricoxib | 1.4 mg | 70 mg |
| 2 | Transcutol HP | 3.0% v/v | 1.50 mL |
| 3 | Tween 80 | 8.0% w/v | 4.00 g |
| 4 | Water for Injection | q.s | q.s. to 50 mL |

Procedure:
1) In a 100 mL beaker poured dispensed quantity of Transcutol HP and dissolved dispensed quantity of drug. Ensured that the solution is clear.
2) Add Tween 80 to above solution under continuous stirring.
3) Made final volume with WFI up to 50 mL in Volumetric Flask of 50 mL.
4) Continued stirring on magnetic stirrer for 30 minutes.

We claim:

1. A stable, clear aqueous composition of COX 2 inhibitors or salts thereof comprising 1.4 mg to 4.0 mg/ml of tricyclic COX 2 inhibitor, the composition having viscosity in range of 1.0 cps to 3 cps, at least two solubilizers in a total amount between 4.2% w/v to 19% w/v, and at least one excipient selected from a solvent/cosolvent, a surfactant, a preservative, an antioxidant, a buffer, and a tonicity modifier.

2. The composition as claimed in claim 1, wherein the COX 2 inhibitor is etoricoxib, celecoxib, valdecoxib, or parecoxib.

3. The composition as claimed in claim 1, wherein at least two solubilizers are selected from solid solubilizers, or liquid solubilizers, or mixtures thereof.

4. The composition as claimed in claim 3, wherein the solid solubilizer is a cyclodextrin (CDs) selected from hydroxy propyl beta cyclodextrin (HP-β-CD or HPBCD), sulfobutyl ether beta cyclodextrin (SBE-β-CD), and mixtures thereof.

5. The composition as claimed in claim 4, wherein the cyclodextrin is hydroxypropylbetacyclodextrin (HPBCD).

6. The composition as claimed in claim 3, wherein the liquid solubilizer is selected from monohydric alcohols, polyhydric alcohols, ethers, esters, diethylene glycol monoethyl ether, poly(ethylene glycol) tetrahydrofurfuryl ether, polysorbates, and mixtures thereof.

7. The composition as claimed in claim 1, wherein at least two solubilizers are selected from a hydroxyalkyl beta cyclodextrin, diethylene glycol monoethyl ether, ethyl alcohol, benzyl alcohol, glycerin, polysorbates, diethylene glycol monoethyl ether, poly(ethylene glycol) tetrahydrofurfuryl ether, propylene glycol, and polyethylene glycol.

8. The composition as claimed in claim 1, where in at least two solubilizers are ethanol and polysorbate, or ethanol and diethylene glycol monoethyl ether, or diethylene glycol monoethyl ether and polysorbate, or HPBCD and diethylene glycol monoethyl ether, or HPBCD and poly(ethylene glycol) tetrahydrofurfuryl ether, or HPBCD and benzyl alcohol.

9. The composition as claimed in claim 8, wherein ratio of HPBCD to diethylene glycol monoethyl ether is from 20:1 to 1:1.

10. The composition as claimed in claim 1, wherein the ratio of COX 2 inhibitor to solubilizers is between 1:27.5 to 1:135.71.

11. The composition as claimed in claim 10, wherein the COX 2 inhibitor is celecoxib or etoricoxib.

12. The composition as claimed in claim 11, comprising up to 0.4% celecoxib or up to 0.14% etoricoxib.

13. The composition as claimed in claim 3, wherein ratio of solid to liquid solubilizers is between 1:1 to 20:1.

14. The composition as claimed in claim 1, wherein a solubilizer is diethylene glycol monoethyl ether and the COX 2 inhibitor to diethylene glycol monoethyl ether ratio is between 1:1.66 to 1:25.

15. The composition as claimed in claim 1, wherein solubilizers are present in an amount from 4.2% w/v to 19% w/v.

16. The composition as claimed in claim 1, wherein the solubilizer is HPBCD and the ratio of COX 2 inhibitor to HPBCD is 1:25 to 1:33.33.

17. The composition as claimed in claim 1, wherein the surfactant is selected from polysorbates, sorbitan mono laurate, lecithin, povidone, and other pharmaceutically acceptable surfactants which may be employed either individually or in combination.

18. The composition as claimed in claim 1, wherein the antioxidant is selected from thioglycerol, acetyl cysteine, butylated hydroxy anisole (BHA) and butylated hydroxy toluene (BHT), ascorbates, ascorbyl palmitate, methyl paraben, propyl paraben, thiomerosal, and mixed tocopheryl ingredient.

19. The composition as claimed in claim 1, wherein the preservative is selected from benzalkonium chloride, benzyl alcohol, m-cresol, parabens, phenols and thiomerosal.

20. The composition as claimed in claim 1, wherein the buffer is selected from sodium, potassium or ammonium salt of a weak acid, tris-(hydroxymethyl)-aminomethane base, sodium citrate, sodium phosphate, sodium hydroxide, tris-(hydroxymethyl)-aminomethane acetate, tris-(hydroxymethyl)-aminomethane HCl, citrates, phosphates, sodium hydroxide, hydrochloric acid, boric acid, citric acid, acetic acid, phosphoric acid, succinic acid, potassium hydroxide, ammonium hydroxide, magnesium oxide, calcium carbonate, magnesium carbonate, malic acid, potassium citrate, sodium phosphate, lactic acid, gluconic acid, tartaric acid, fumaric acid, diethanolamine, monoethanolamine, sodium carbonate, sodium bicarbonate, triethanolamine, and any combination thereof.

21. The composition as claimed in claim 1, wherein the tonicity modifier is selected from sodium chloride and dextrose anhydrous, glycerin, mannitol, and potassium chloride, and mixtures thereof.

22. A composition comprising etoricoxib up to 1.4 mg/ml, having viscosity in range of 1.0 cps to 3 cps, at least two solubilizers in a total amount between 4.2% w/v to 19% w/v, and at least one excipient selected from a solvent/cosolvent, a surfactant, a preservative, an antioxidant, a buffer, and a tonicity modifier.

23. A composition comprising celecoxib up to 4 mg/ml, having viscosity in range of 1.0 cps to 3 cps, at least two solubilizers in a total amount between 4.2% w/v to 19% w/v, and at least one excipient selected from a solvent/cosolvent, a surfactant, a preservative, an antioxidant, a buffer, and tonicity modifier.

24. The composition as claimed in claim 1, wherein the COX 2 inhibitor is etoricoxib or celecoxib and at least one of the solubilizers is diethylene glycol monoethyl ether or poly(ethylene glycol) tetrahydrofurfuryl ether or HPBCD.

25. The composition as claimed in claim 1, presented in dosage form for parenteral, topical, oral or any other route of administration.

26. The composition as claimed in claim 22, wherein the composition is devoid of HPBCD.

27. The composition as claimed in claim 22, wherein the composition comprises HPBCD as one of the solubilizers.

* * * * *